(12) United States Patent
Sasaki

(10) Patent No.: US 7,391,522 B2
(45) Date of Patent: Jun. 24, 2008

(54) THREE-DIMENSIONAL SHAPE DETECTING DEVICE, IMAGE CAPTURING DEVICE, AND THREE-DIMENSIONAL SHAPE DETECTING PROGRAM

(75) Inventor: Hiroyuki Sasaki, Chita (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 316 days.

(21) Appl. No.: 11/390,067

(22) Filed: Mar. 28, 2006

(65) Prior Publication Data
US 2006/0192082 A1    Aug. 31, 2006

Related U.S. Application Data

(63) Continuation-in-part of application No. PCT/JP2004/014167, filed on Sep. 28, 2004.

(30) Foreign Application Priority Data
Sep. 29, 2003    (JP)    ............................... 2003-337066

(51) Int. Cl.
    *G01B 11/24*    (2006.01)
(52) U.S. Cl. ........................ 356/601; 356/603
(58) Field of Classification Search ............ 355/18–77; 356/600–640; 359/205
See application file for complete search history.

(56) References Cited

U.S. PATENT DOCUMENTS

| | | | | |
|---|---|---|---|---|
| 4,634,279 A | * | 1/1987 | Ross et al. | 356/610 |
| 4,846,577 A | * | 7/1989 | Grindon | 356/610 |
| 5,561,526 A | * | 10/1996 | Huber et al. | 356/604 |
| 5,668,631 A | | 9/1997 | Norita et al. | |
| 6,028,672 A | * | 2/2000 | Geng | 356/602 |
| 6,072,899 A | * | 6/2000 | Irie et al. | 382/149 |
| 6,341,016 B1 | * | 1/2002 | Malione | 356/603 |
| 6,449,044 B1 | | 9/2002 | Pawa | |
| 6,495,848 B1 | * | 12/2002 | Rubbert | 250/559.22 |
| 6,690,474 B1 | * | 2/2004 | Shirley | 356/603 |

FOREIGN PATENT DOCUMENTS

| | | |
|---|---|---|
| JP | A 9-289611 | 11/1997 |
| JP | A 11-94530 | 4/1999 |
| JP | B2 3282331 | 3/2002 |
| JP | A 2003-254727 | 9/2003 |
| JP | A 2004-108950 | 4/2004 |

\* cited by examiner

*Primary Examiner*—Gregory J. Toatley, Jr.
*Assistant Examiner*—Jarreas C Underwood
(74) *Attorney, Agent, or Firm*—Oliff & Berridge, PLC

(57) ABSTRACT

A three-dimensional shape detecting means includes a projecting device which projects pattern light; an image capturing device which captures a pattern light projection image; a pattern light position extracting device which extracts a position of the pattern light projected on the subject; a three-dimensional shape calculation device which calculates three-dimensional shape of the subject; a storage device which stores color value data of the pattern light projection image; a hue parameter calculation device which calculates hue parameters corresponding to a main hue; a luminance parameter calculation device which calculates luminance parameters in units of pixels; and a pattern light detecting device which detects pixels representing the pattern light. The pattern light position extracting device extracts the position of the pattern light based on the pixels representing the pattern light detected by the pattern light detecting device.

12 Claims, 17 Drawing Sheets

FIG. 1
(a)
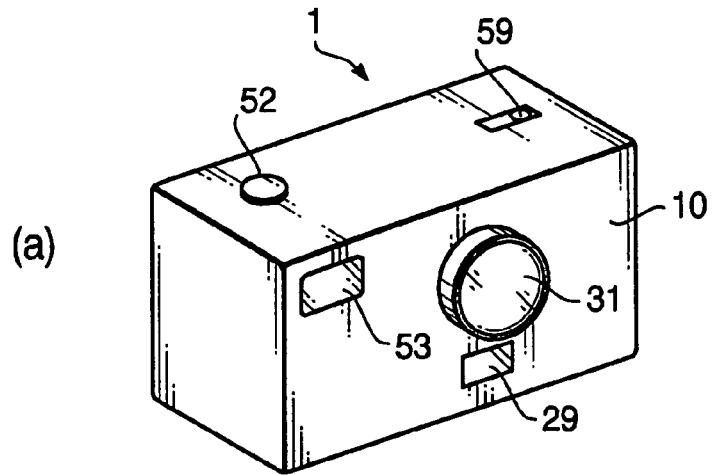
(b)
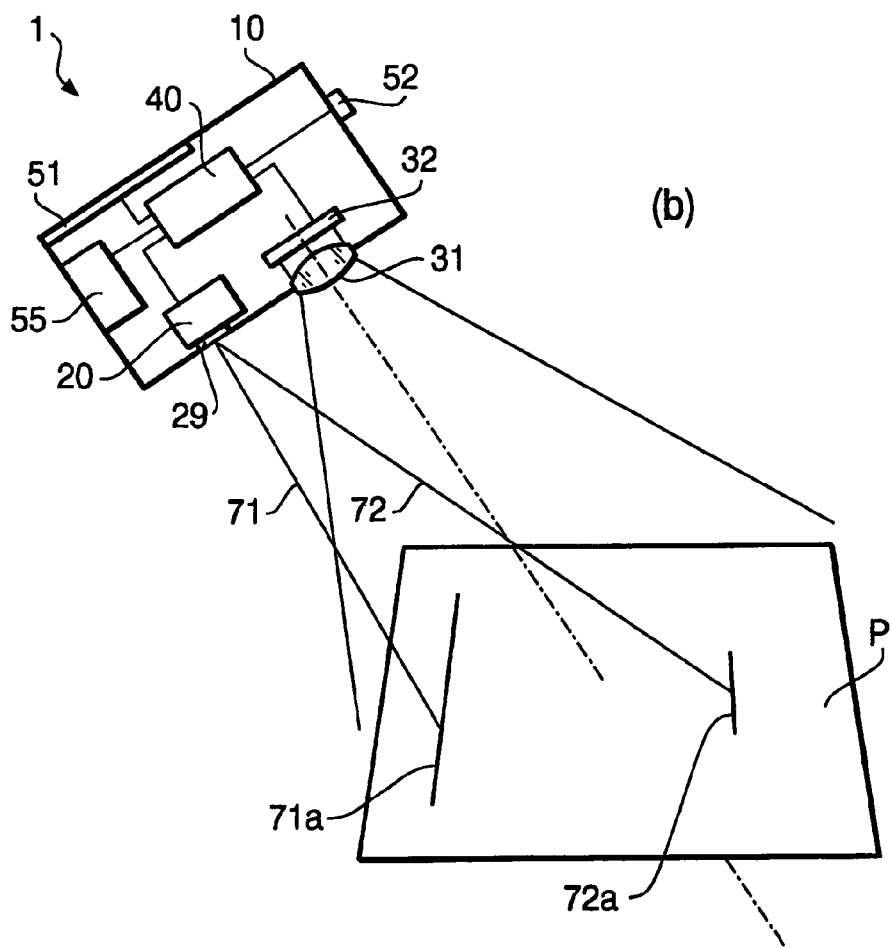

FIG.10
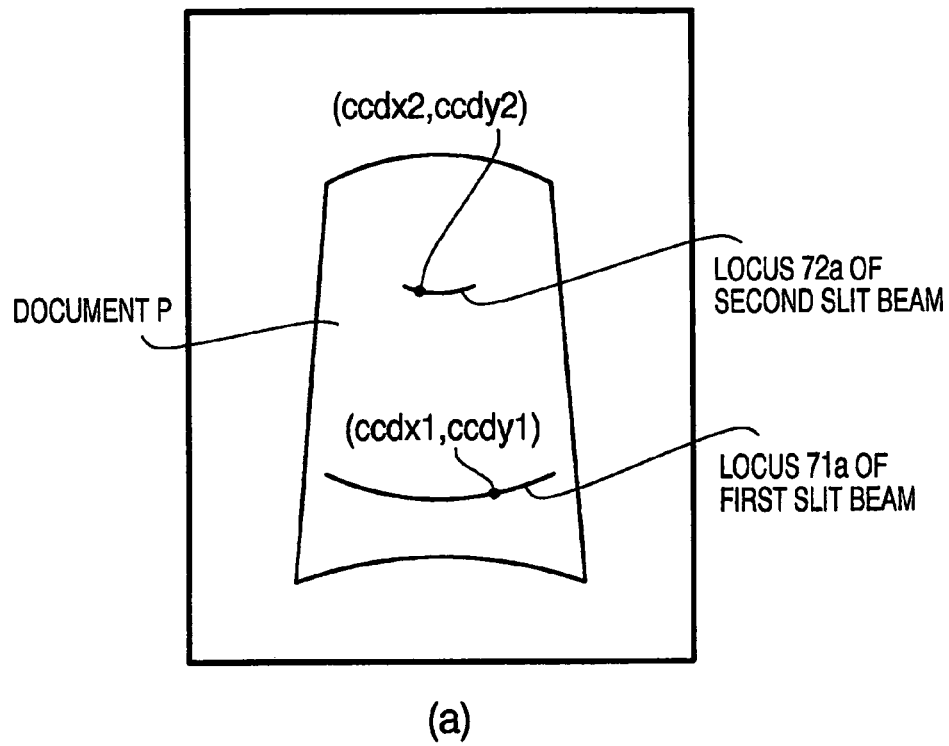
(a)
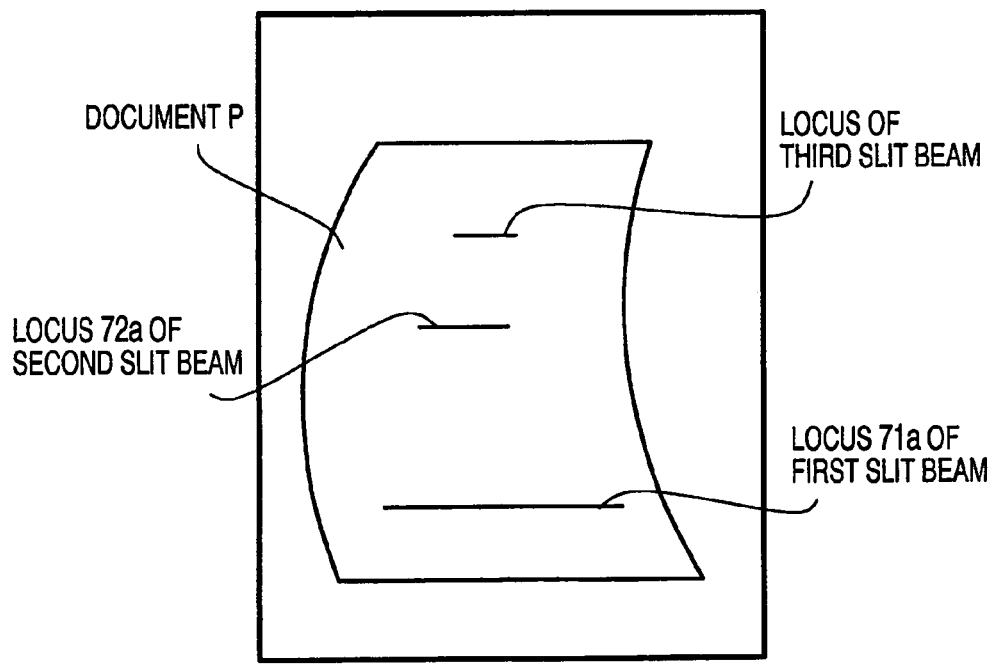
(b)

FIG.11
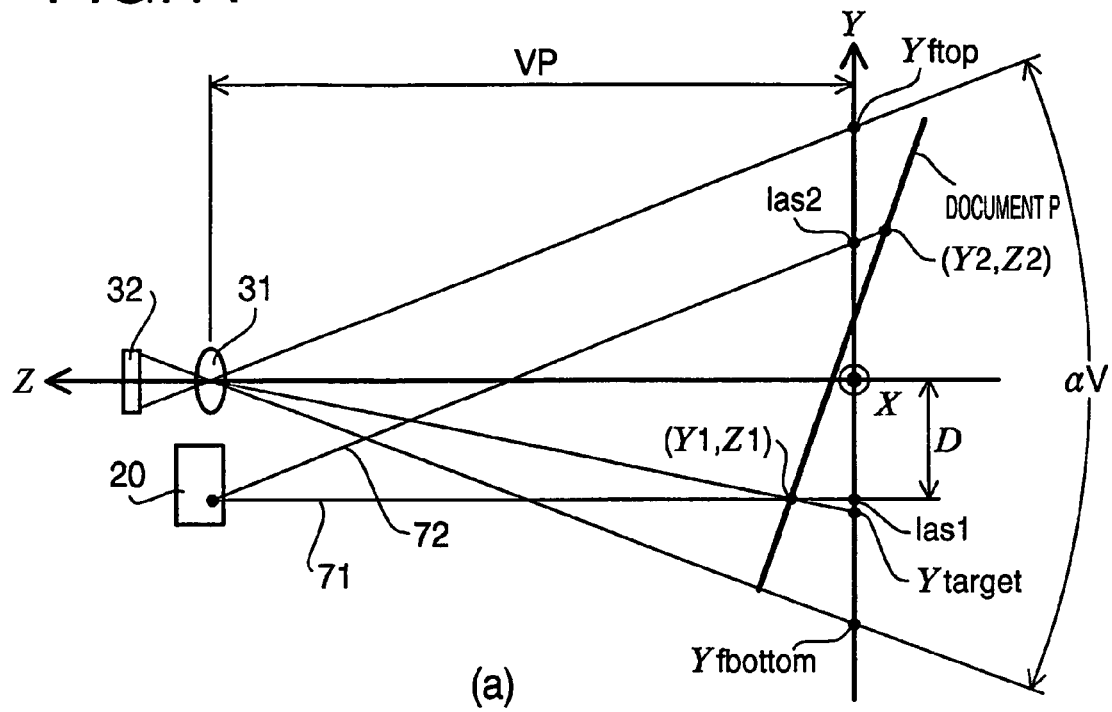
(a)
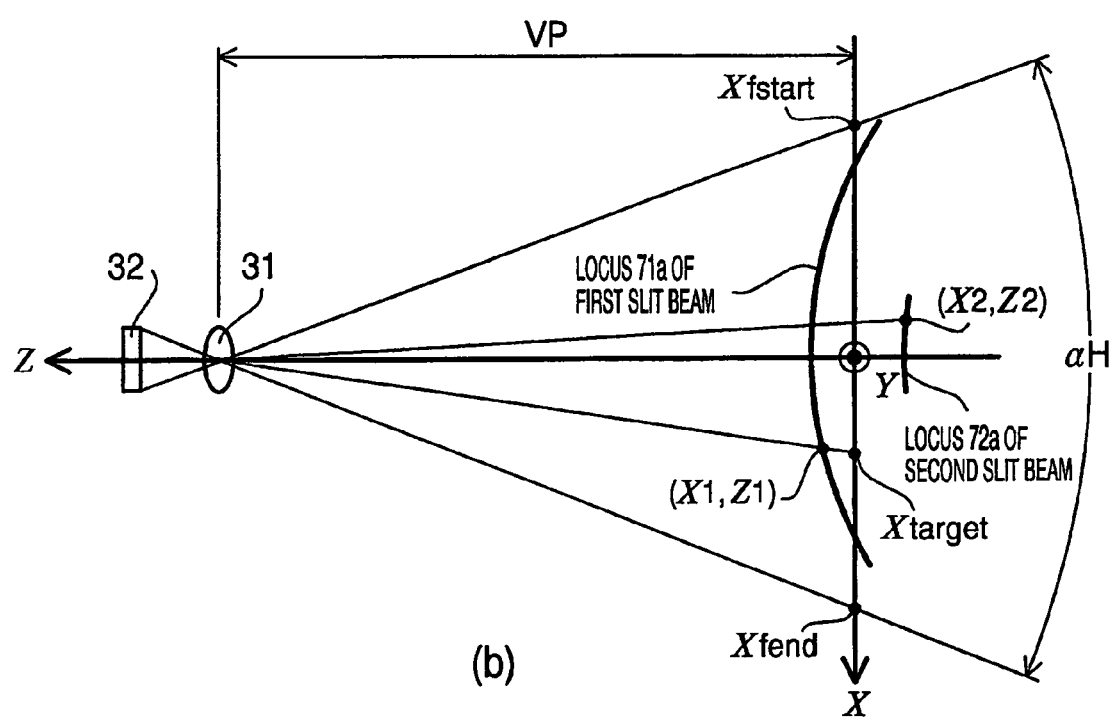
(b)

FIG. 12
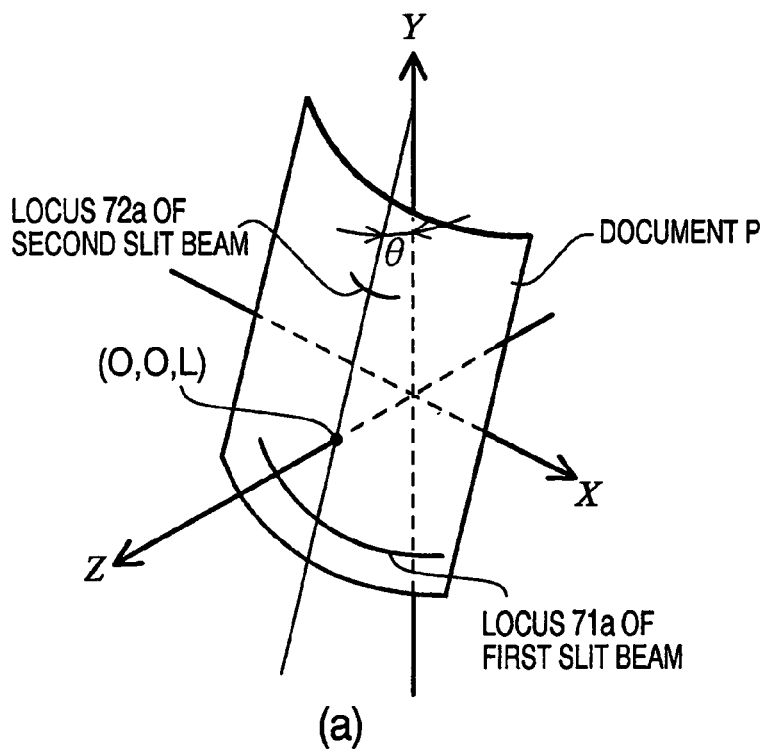
(a)
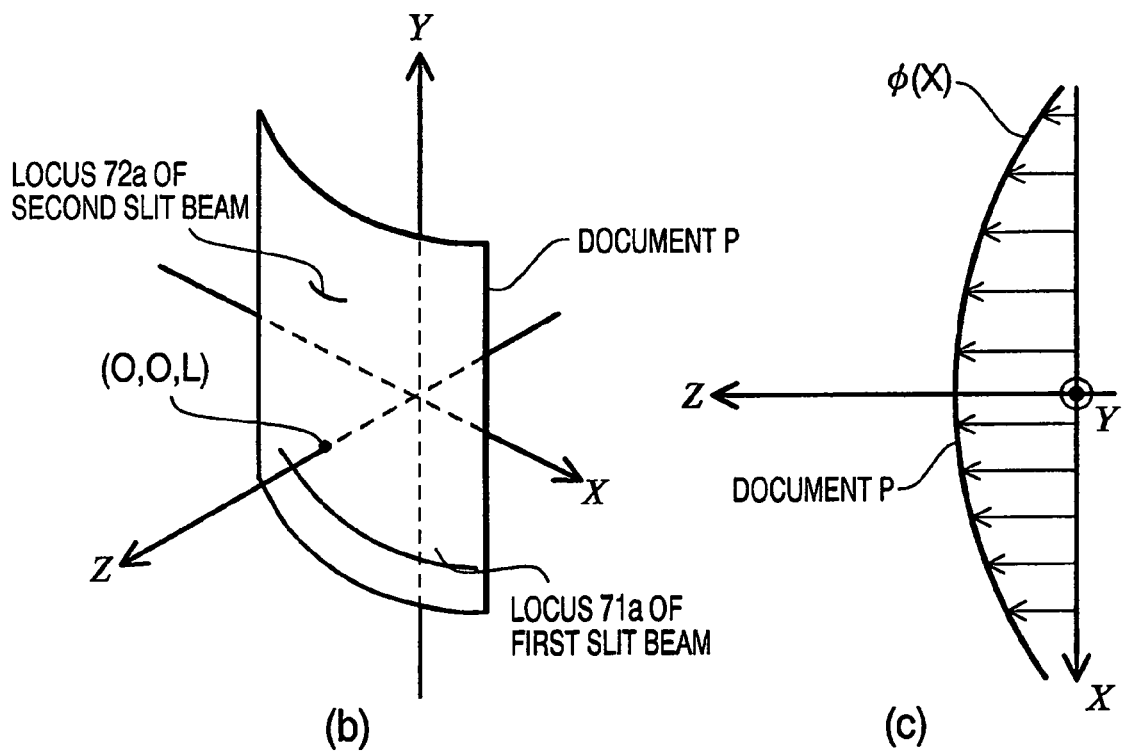
(b)      (c)

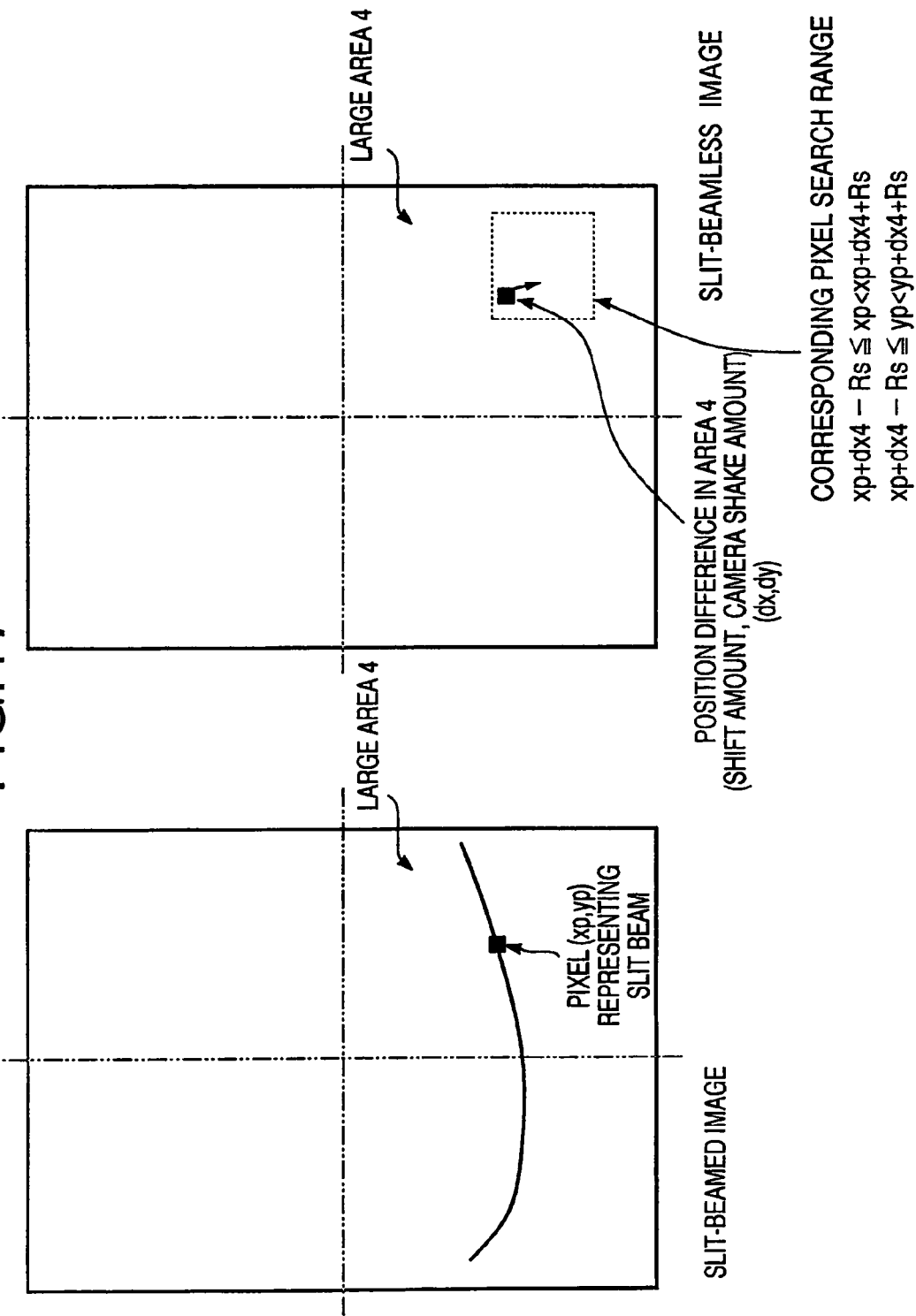

THREE-DIMENSIONAL SHAPE DETECTING DEVICE, IMAGE CAPTURING DEVICE, AND THREE-DIMENSIONAL SHAPE DETECTING PROGRAM

This is a Continuation-in-Part of Application No. PCT/JP2004/014167 filed Sep. 28, 2004, which claims the benefit of Japanese Patent Application No. 2003-337066 filed Sep. 29, 2003. The disclosure of the prior applications is hereby incorporated by reference herein in its entirety.

TECHNICAL FIELD

The present invention relates to a three-dimensional shape detecting device, an image capturing device, and a three-dimensional shape detecting program for detecting the three-dimensional shape of a subject by use of pattern light.

BACKGROUND OF THE INVENTION

An image capturing device, equipped with a correction means capable of correcting a captured image (an image of a subject such as a white board, a book, etc. captured by the device) as if the subject were shot from the front even when the subject is shot from a direction oblique to the front of the subject, is well known today. Such a correction means makes the correction by detecting the three-dimensional shape of the subject based on the captured image of the subject. A portable digital camera equipped with such a correction means has been disclosed in, for example, FIG. 1, etc. of Japanese Patent Provisional Publication No. HEI09-289611 (hereinafter referred to as a "document No. 1").

A technique for detecting the three-dimensional shape of the subject as parameters required by the aforementioned correction means has been disclosed in the tenth paragraph, FIG. 3, etc. of Japanese Patent Publication No.3282331 (hereinafter referred to as a "document No.2"). Specifically, the document No. 2 discloses a three-dimensional shape measurement device of a stationary type. The device extracts slit beams projected on the subject by subtracting a slit-beamless image (obtained by shooting the subject on which no slit beams are projected) from a slit-beamed image (obtained by shooting the subject on which the slit beams are projected), and detects the three-dimensional shape of the subject based on the extracted slit beams.

DISCLOSURE OF THE INVENTION

The three-dimensional shape measurement device mentioned above is a device of the stationary type, and thus the degree of freedom in image capturing is necessitated to be restricted and that is inconvenient to users. Therefore, three-dimensional shape measurement devices are desired to be portable. However, with a portable three-dimensional shape measurement device, there are cases where a shift or deviation occurs between the shooting position of the slit-beamed image and that of the slit-beamless image due to the so-called "camera shake". In such cases, a shift naturally occurs also between the slit-beamed image and the slit-beamless image, which makes it impossible to extract the slit beams precisely even by the subtraction of the slit-beamless image from the slit-beamed image.

The present invention has been made in order to resolve the above problem. It is therefore the primary object of the present invention to provide a three-dimensional shape detecting device, an image capturing device and a three-dimensional shape detecting program capable of detecting pattern light from a pattern light projection image (obtained by capturing a subject on which the pattern light is projected) with high accuracy.

In order to achieve the above object, an aspect of the present invention provides a three-dimensional shape detecting device comprising: projection means which projects pattern light; image capturing means which captures a pattern light projection image of a subject on which the pattern light is projected; pattern light position extracting means which extracts a position of the pattern light projected on the subject based on the pattern light projection image captured by the image capturing means; and three-dimensional shape calculation means which calculates three-dimensional shape of the subject based on the position of the pattern light extracted by the pattern light position extracting means. The three-dimensional shape detecting device further comprises: storage means which stores color value data of the pattern light projection image captured by the image capturing means; hue parameter calculation means which calculates hue parameters corresponding to a main hue forming the pattern light in units of pixels based on the color value data stored in the storage means; luminance parameter calculation means which calculates luminance parameters in units of pixels based on the color value data stored in the storage means; and pattern light detecting means which detects pixels representing the pattern light from the pattern light projection image by use of the luminance parameters calculated by the luminance parameter calculation means and the hue parameters calculated by the hue parameter calculation means. The pattern light position extracting means extracts the position of the pattern light based on the pixels representing the pattern light detected by the pattern light detecting means.

With the above configuration, the difference between the pixels representing the pattern light and the other pixels becomes clear and the pixels representing the pattern light can be detected with high accuracy even in an image captured in a general lighting environment, by which the position of the pattern light can be extracted with high accuracy.

Further, since the pixels representing the pattern light are determined based on the luminance parameters and the hue parameters corresponding to the main hue forming the pattern light, the difference between the pixels representing the pattern light and the other pixels becomes clear even when the pixels representing the pattern light are contained in an illumination reflecting part having low chroma saturation or in a printed part that has been printed in a color of low luminance similar to the pattern light, by which the pixels representing the pattern light can be detected with high accuracy. Consequently, the position of the pattern light can be extracted with high accuracy.

In order to achieve the above object, another aspect of the present invention provides a three-dimensional shape detecting device comprising: projection means which projects pattern light; image capturing means which captures a pattern light projection image of a subject on which the pattern light is projected, while also capturing a pattern light non-projection image corresponding to the pattern light projection image as an image of the subject on which the pattern light is not projected; pattern light position extracting means which extracts a position of the pattern light projected on the subject based on the pattern light projection image captured by the image capturing means; and three-dimensional shape calculation means which calculates three-dimensional shape of the subject based on the position of the pattern light extracted by the pattern light position extracting means. The three-dimensional shape detecting device further comprises: pattern light detecting means which detects pixels representing the pattern light from the pattern light projection image; and search means which searches the pattern light non-projection image to judge whether a pixel corresponding to each of the pixels representing the pattern light detected by the pattern light detecting means exists in the pattern light non-projection image or not. The pattern light position extracting means uses each pixel detected by the pattern light detecting means for the extraction of the position of the pattern light if no pixel corresponding to the pixel is found in the pattern light non-projection image by the search means.

With the above configuration, even when a pixel is detected by the pattern light detecting means from the pattern light projection image as a pixel representing the pattern light, if a pixel corresponding to the pixel is found in the pattern light non-projection image, the extraction of the position of the pattern light is not executed using the pixel (that is, the pixel is not regarded as a target of extraction as the pattern light). On the other hand, when a pixel representing the pattern light is detected from the pattern light projection image and no pixel corresponding to the pixel is found in the pattern light non-projection image, the extraction of the position of the pattern light is executed using the pixel. Therefore, the position of the pattern light can be extracted with high accuracy.

In order to achieve the above object, another aspect of the present invention provides a three-dimensional shape detecting program comprising: a pattern light position extraction step of extracting a position of pattern light projected on a subject based on a pattern light projection image captured by image capturing means which captures the pattern light projection image of the subject on which the pattern light is projected; and a three-dimensional shape calculation step of calculating three-dimensional shape of the subject based on the position of the pattern light extracted by the pattern light position extraction step. The three-dimensional shape detecting program further comprises: a storage step of storing color value data of the pattern light projection image; a hue parameter calculation step of calculating hue parameters corresponding to a main hue forming the pattern light in units of pixels based on the color value data stored by the storage step; a luminance parameter calculation step of calculating luminance parameters in units of pixels based on the color value data stored by the storage step; and a pattern light detecting step of detecting pixels representing the pattern light from the pattern light projection image by use of the luminance parameters calculated by the luminance parameter calculation step and the hue parameters calculated by the hue parameter calculation step. The pattern light position extraction step extracts the position of the pattern light based on the pixels representing the pattern light detected by the pattern light detecting step.

With the above configuration, the difference between the pixels representing the pattern light and the other pixels becomes clear and the pixels representing the pattern light can be detected with high accuracy even in an image captured in a general lighting environment, by which a locus of the pattern light can be extracted with high accuracy.

Further, since the pixels representing the pattern light are determined based on the luminance parameters and the hue parameters corresponding to the main hue forming the pattern light, the difference between the pixels representing the pattern light and the other pixels becomes clear even when the pixels representing the pattern light are contained in an illumination reflecting part having low hue parameters or in a printed part that has been printed in a color of a low luminance parameter similar to the pattern light, by which the pixels representing the pattern light can be detected with high accuracy. Consequently, the position of the pattern light can be extracted with high accuracy.

BRIEF DESCRIPTION OF THE ACCOMPANYING DRAWINGS

FIG. 1(a) is an external perspective view of an image capturing device.

FIG. 1(b) is a schematic sectional view of the image capturing device 1.

FIGS. 3(a) and 3(b) are schematic diagrams for explaining angular widths of slit beams.

Figure 4:
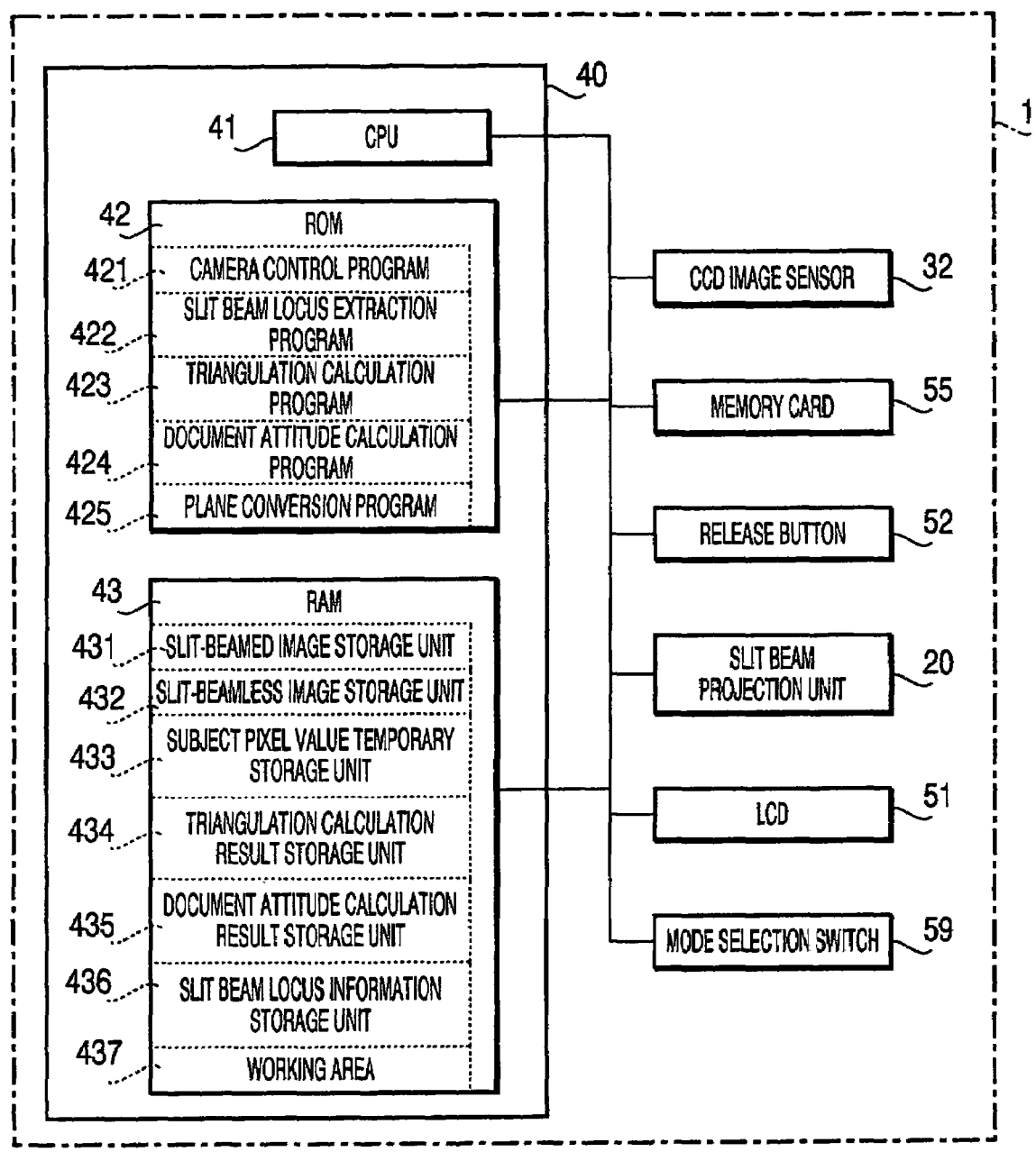

FIG. 4 is a block diagram showing the electrical configuration of the image capturing device.

Figure 5:
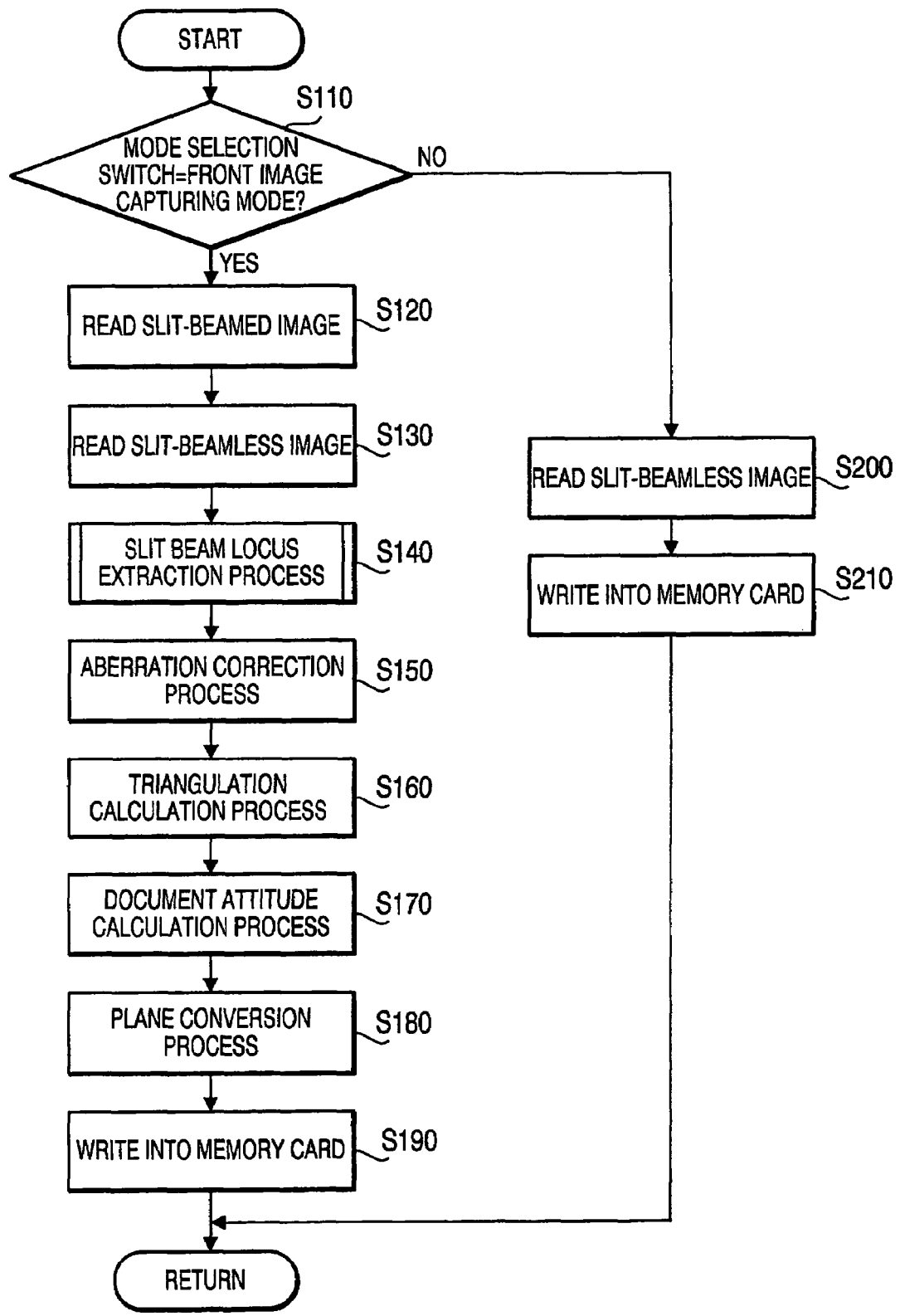

FIG. 5 is a flow chart showing a process executed by a processor.

Figure 6:
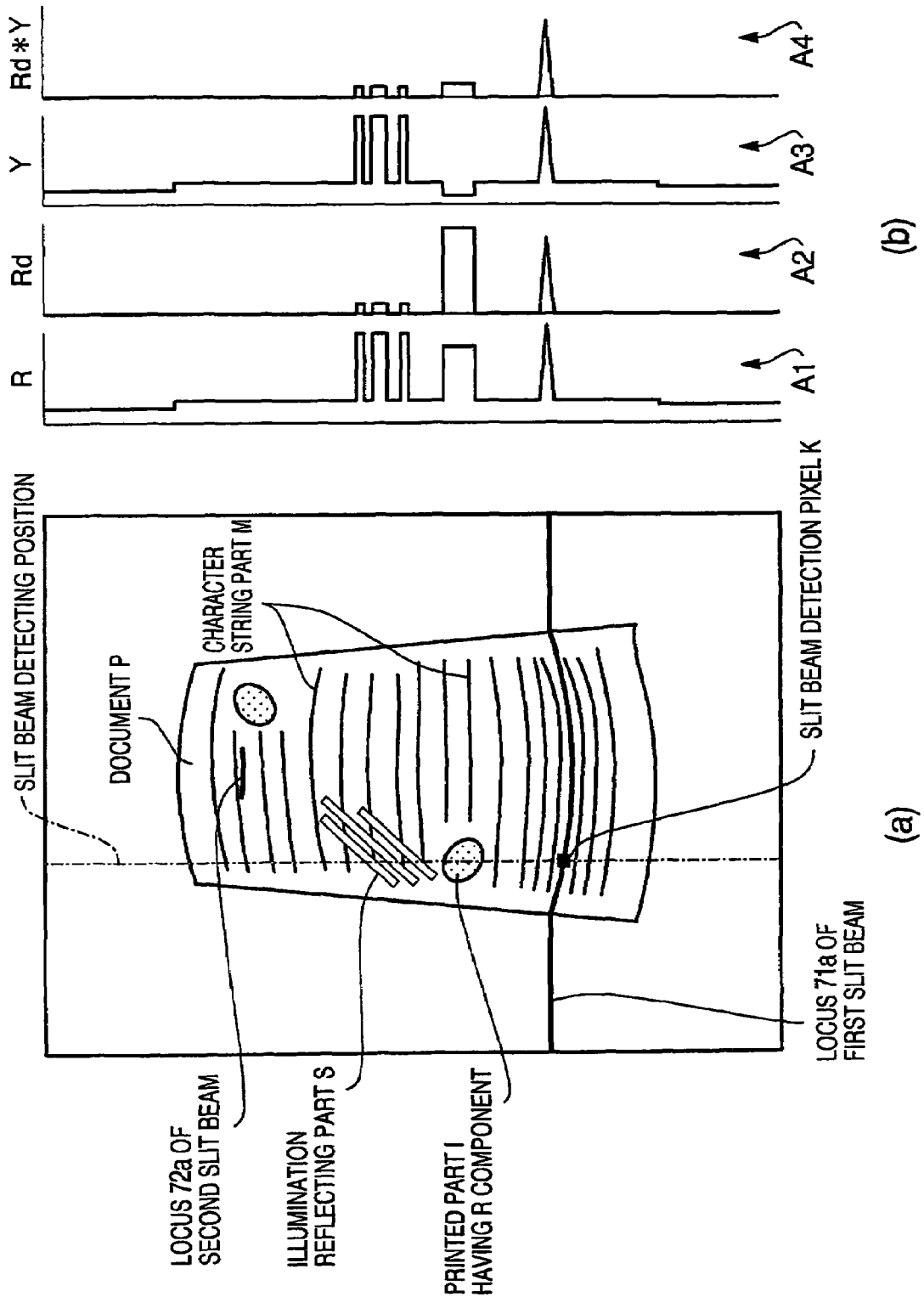

FIGS. 6(a) and 6(b) are schematic diagrams for explaining the principle of a slit beam locus extraction process.

Figure 7:
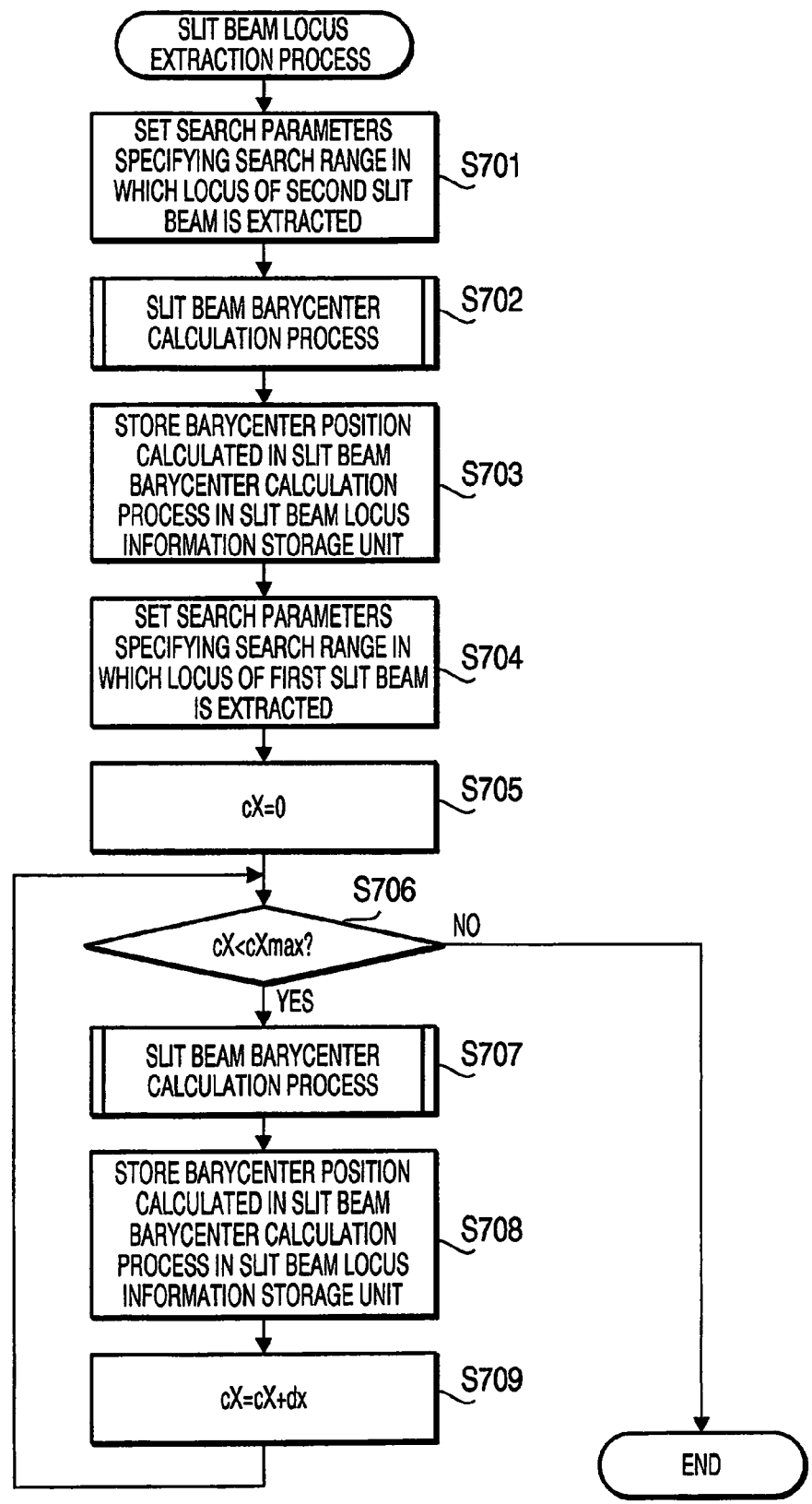

FIG. 7 is a flow chart showing the slit beam locus extraction process.

Figure 8:
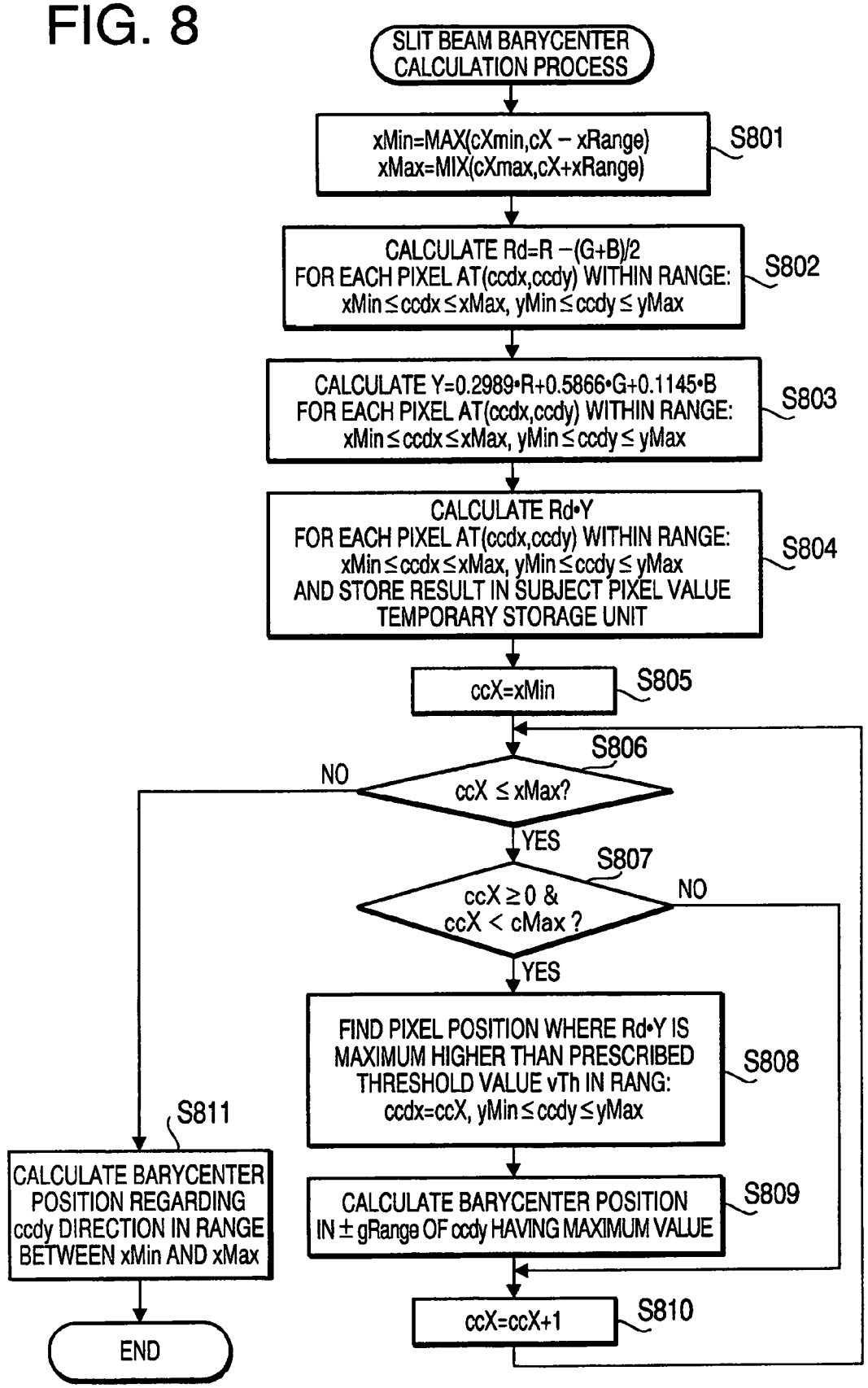

FIG. 8 is a flow chart showing a slit beam barycenter calculation process.

FIG. 9(a) shows a captured image of a document P onto which the slit beams are projected.

FIG. 9(b) is an enlarged view schematically showing pixels around a slit beam detecting position cX.

FIGS. 10(a) and 10(b) are schematic diagrams for explaining a slit-beamed image.

FIGS. 11(a) and 11(b) are schematic diagrams for explaining a method for calculating three-dimensional spatial positions.

FIGS. 12(a), 12(b) and 12(c) are schematic diagrams for explaining a coordinate system used in document attitude calculation.

Figure 13:
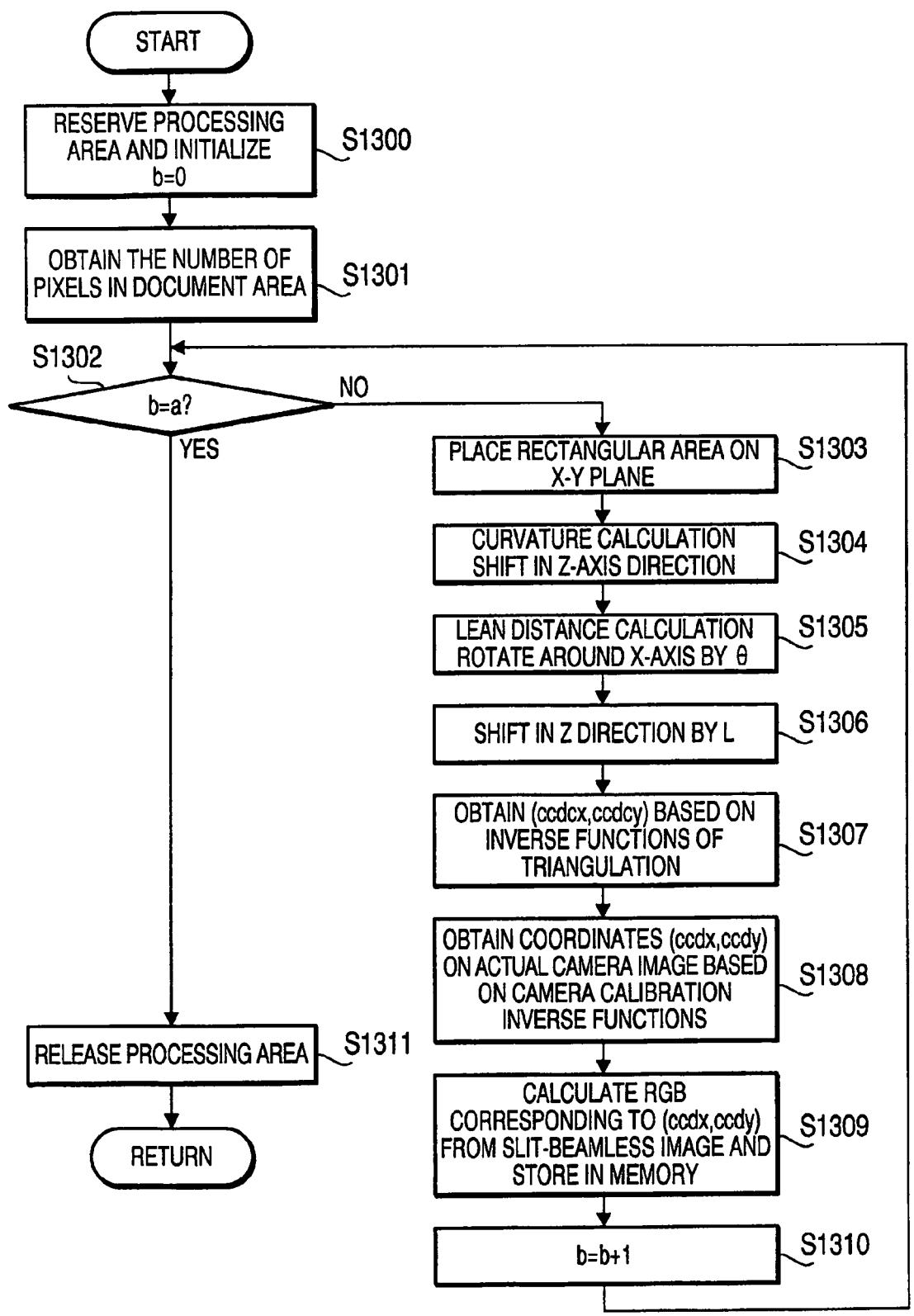

FIG. 13 is a flow chart showing a plane conversion process.

Figure 14:
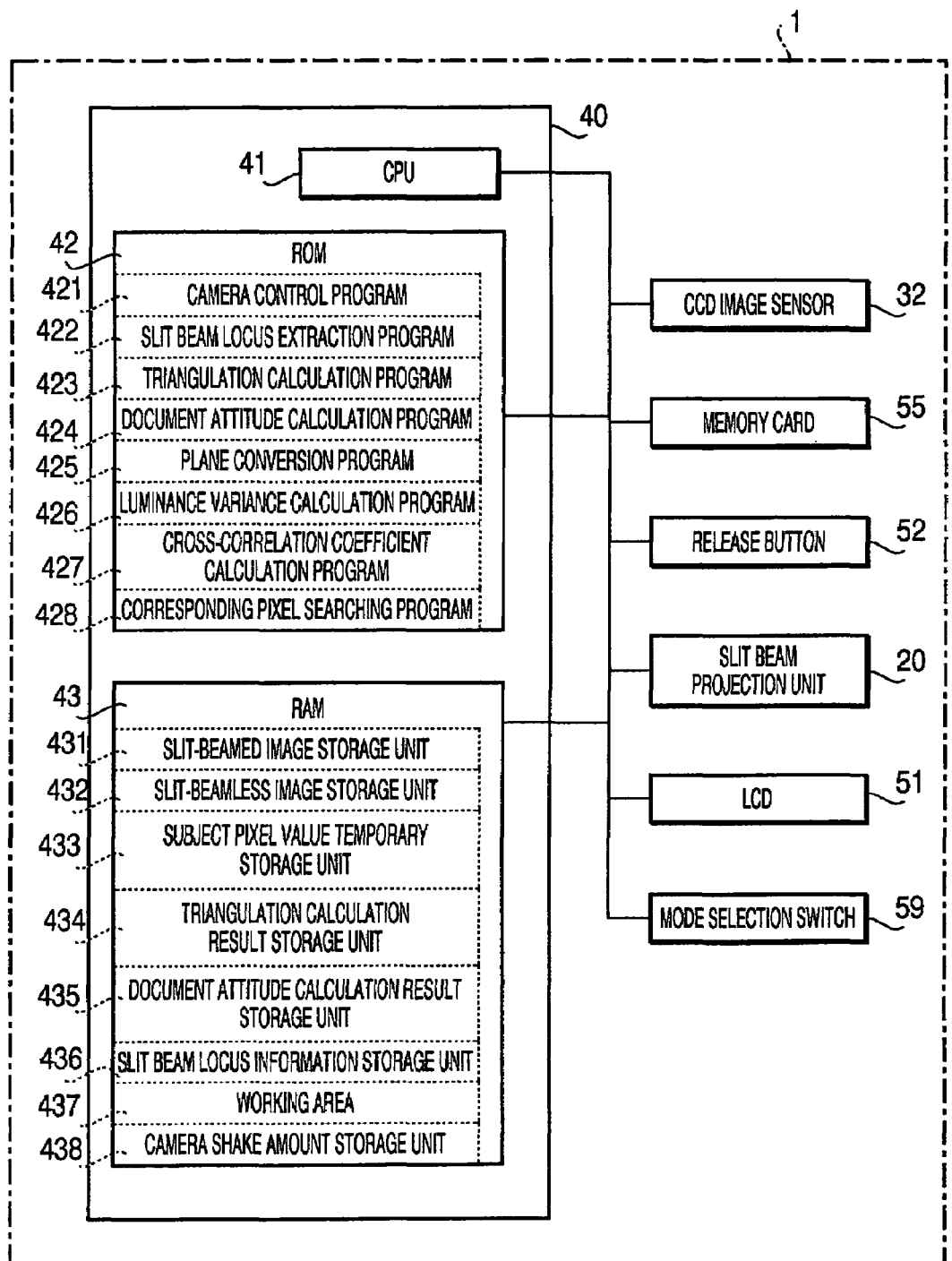

FIG. 14 is a block diagram showing the electrical configuration of an image capturing device in accordance with a second embodiment.

Figure 15:
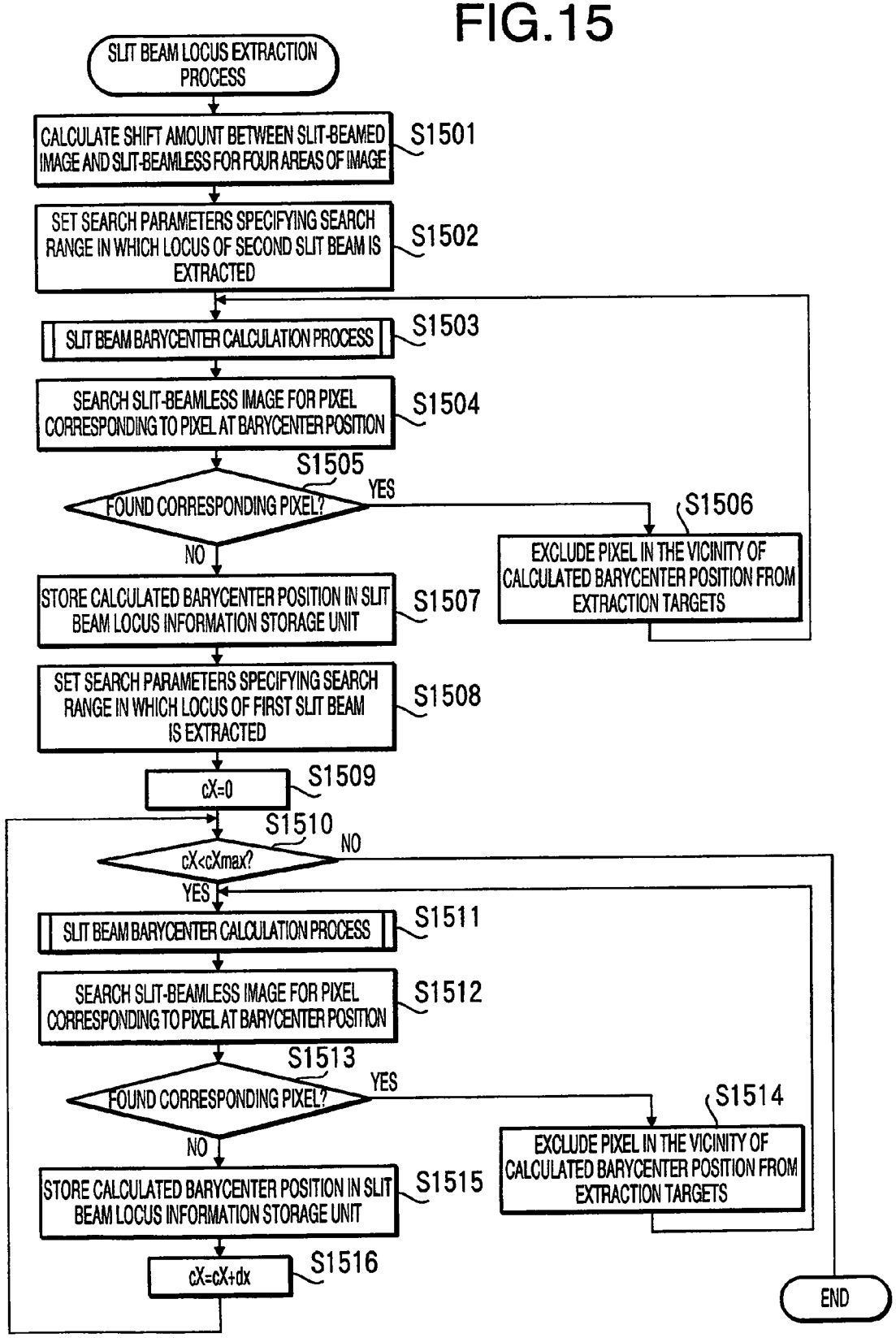

FIG. 15 is a flow chart showing a slit beam locus extraction process in accordance with the second embodiment.

Figure 16:
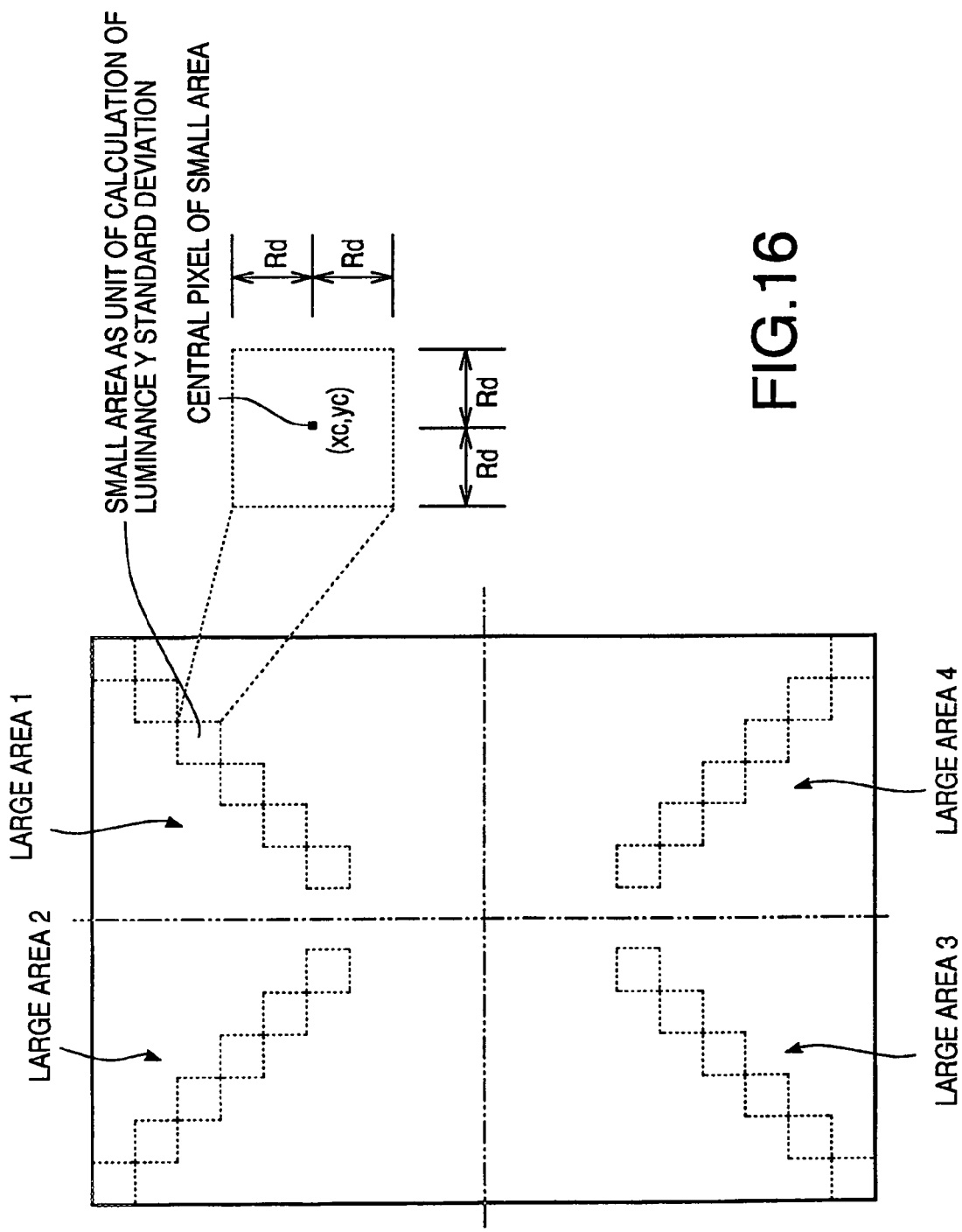

FIG. 16 is a schematic diagram for explaining a method for setting a search range which is used for searching for a corresponding pixel in a slit-beamless image.

FIG. 17 is a schematic diagram for explaining a method for setting the search range in the slit-beamless image taking a camera shake amount into consideration.

DESCRIPTION OF REFERENCE CHARACTERS 1 image capturing device (including a three-dimensional shape detecting device)
20 slit beam projection unit (pattern light projection means)
32 CCD image sensor (image capturing means)
55 memory card (storage means)
421 camera control program (image capturing means)
422 slit beam locus extraction program (pattern light locus extraction means, hue parameter calculation means, luminance parameter calculation means, emphasis parameter calculation means, pattern light detecting means)
423 triangulation calculation program (pattern light locus extraction means)
424 document attitude calculation program (three-dimensional shape calculation means)

425 plane conversion program (plane image correction means)
426 luminance variance calculation program
427 cross-correlation coefficient calculation program
428 corresponding pixel searching program (search means)
431 slit-beamed image storage unit (storage means)
432 slit-beamless image storage unit

DETAILED DESCRIPTION OF THE EMBODIMENTS

Referring now to the drawings, a description will be given in detail of preferred embodiments in accordance with the present invention. FIG. 1(a) is an external perspective view of an image capturing device 1 in accordance with an embodiment of the present invention. FIG. 1(b) is a schematic sectional view of the image capturing device 1. Incidentally, a three-dimensional shape detecting device as an embodiment of the present invention is included in the image capturing device 1.

The image capturing device 1 includes a body case 10 in a box shape, an imaging lens 31 provided at the front of the body case 10, a CCD image sensor 32 placed at the rear of the imaging lens 31 (inside the image capturing device 1), and a slit beam projection unit 20 placed underneath the imaging lens 31. Further, the image capturing device 1 includes a processor 40 installed in the body case 10, a release button 52 and a mode selection switch 59 placed on top of the body case 10, and a memory card 55 inserted in the body case 10. The above components are connected together by signal lines as shown in FIG. 4.

The image capturing device 1 is further equipped with an LCD (Liquid Crystal Display) 51 provided on the back of the body case 10 and a finder 53 provided to penetrate the body case 10 from its back to front, which are used when the user decides an imaging range to be captured by the image capturing device 1.

The imaging lens 31 is formed by a plurality of lenses. The image capturing device 1 has the autofocus function and automatically adjusts the focal length and aperture, by which the imaging lens 31 is driven so as to focus light from the outside on the CCD image sensor 32.

The CCD image sensor 32 includes photoelectric transducers such as CCDs (Charge Coupled Devices) which are arranged like a matrix. The CCD image sensor 32 generates signals corresponding to colors and intensities of light of the image forming on its surface, converts the signals into digital data, and outputs the digital data to the processor 40. Incidentally, data outputted by one CCD is pixel data of one pixel forming the image. A piece of image data includes the same number of pixel data as the CCDs.

Figure 2:
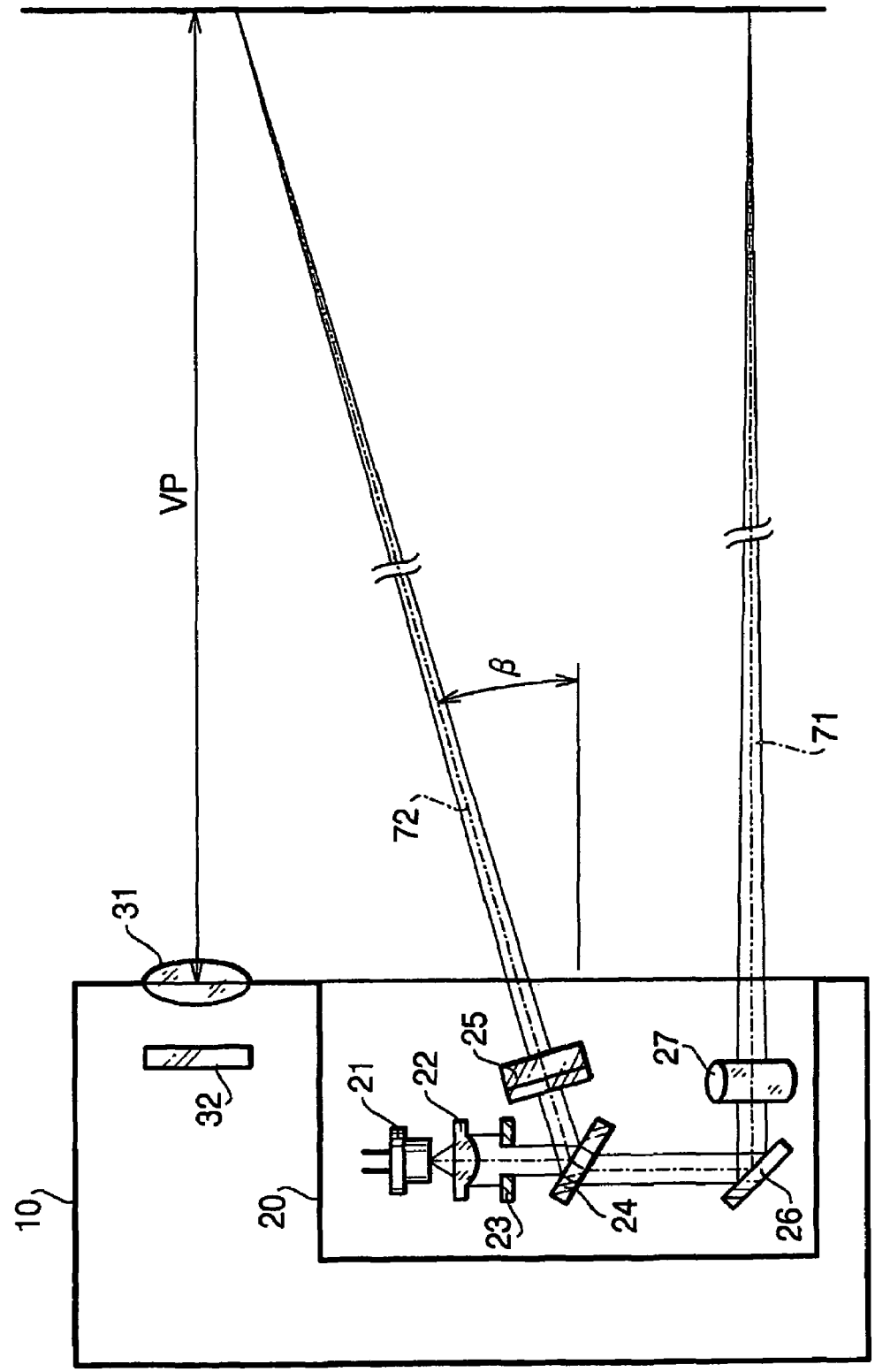
FIG. 2 is a schematic diagram showing the composition of a slit beam projection unit.
Figure 3:
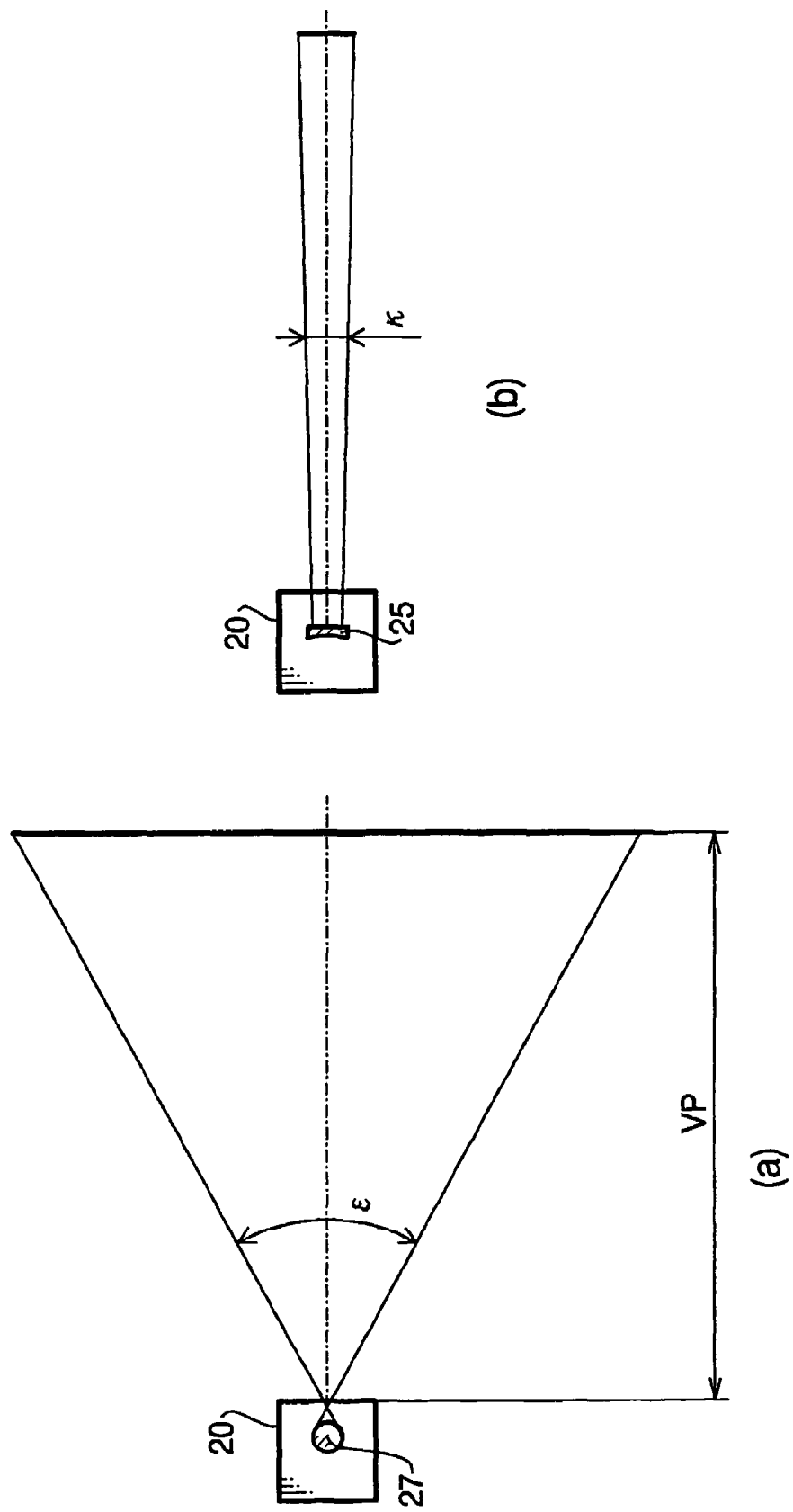

The slit beam projection unit 20 will be explained below referring to FIGS. 2 and 3. FIG. 2 is a schematic diagram showing the composition of the slit beam projection unit 20. FIG. 3 is a schematic diagram for explaining angular widths of slit beams. The slit beam projection unit 20 includes a laser diode 21, a collimator lens 22, an aperture 23, a transparent flat plate 24, a cylindrical lens 25, a reflecting mirror 26 and a rod lens 27.

The laser diode 21 emits a red laser beam. The ON-OFF switching of the laser beam emission by the laser diode 21 is controlled according to instructions outputted by the processor 40. The output level (rated power) of the laser diode 21 is adjusted so that a prescribed output level (e.g. 1 mW) can be achieved at a position just after the aperture 23 relative to the maximum rated power (e.g. 5 mW), in consideration of individual differences in the spread angle of the laser beam.

The collimator lens 22 condenses the laser beam emitted by the laser diode 21 so that the beam will focus at a point a reference distance VP (e.g. 330 mm) away from the slit beam projection unit 20.

The aperture 23, formed by a plate having a rectangular opening part, shapes the laser beam from the collimator lens 22 into a rectangular shape by letting part of the laser beam through the opening part.

The transparent flat plate 24 is composed of a transparent flat plate made of pure glass material, for example. The back of the transparent flat plate 24 is provided with an AR coat (antireflection coating). The transparent flat plate 24 is tilted toward the front of the body case 10 by a prescribed angle β (e.g. 33 degrees) with respect to a plane orthogonal to the optical axis of the laser beam from the aperture 23. The transparent flat plate 24 reflects approximately 5% (approximately 50 μW) of the power of the laser beam from the aperture 23 by its surface while transmitting approximately 95% (approximately 950 μW). Incidentally, the direction into which the laser beam is reflected by the transparent flat plate 24 (frontward from the image capturing device 1 and 33 degrees upward relative to the horizontal plane) will be referred to as a "second direction".

Thanks to the AR coat provided on the back of the transparent flat plate 24, reflection occurring when the laser beam entering the transparent flat plate 24 emerges therefrom is suppressed, by which loss of the laser beam inside the transparent flat plate 24 is reduced. Further, by setting the ratio of the laser beam reflected by the transparent flat plate 24 at a surface reflectance 5% which is determined by the refractive index of the material of the transparent flat plate 24, a process for forming a vapor-deposited metal film on the reflecting surface (necessary when the component is implemented by an ordinary half mirror) can be left out.

The reflecting mirror 26 includes a member (mirror, etc.) totally reflecting the laser beam. The reflecting mirror 26 is placed on the downstream side of the transparent flat plate 24 transmitting the laser beam, while being tilted toward the front of the body case 10 by 45 degrees. The reflecting mirror 26 totally reflects the laser beam and changes its optical path direction by 90 degrees. The direction into which the laser beam is reflected by the reflecting mirror 26 (frontward from the image capturing device 1 and at 0 degrees relative to the horizontal plane) will be referred to as a "first direction".

The rod lens 27 is formed by a lens of a cylindrical shape having a short positive focal length. The rod lens 27 is placed on the downstream side of the reflecting mirror 26 reflecting the laser beam so that the axis of the cylindrical shape will be in the vertical direction. The focal length of the rod lens 27 is short. Therefore, as shown in FIG. 3(a), the laser beam passing through the rod lens 27 immediately starts spreading from a focal point in the vicinity of the rod lens 27 and is outputted in the first direction as a slit beam having a prescribed spread angle ε (e.g. 48 degrees). Incidentally, the slit beam emerging from the rod lens 27 will hereinafter be referred to as a "first slit beam 71".

The cylindrical lens 25 is a lens having a concave shape on one side to have a negative focal length. The cylindrical lens 25 is placed on the downstream side of the transparent flat plate 24 reflecting the laser beam so that its lens surface will be orthogonal to the second direction. As shown in FIG. 3(b), the cylindrical lens 25 receives the laser beam incident from the transparent flat plate 24 and outputs the laser beam as a slit beam spreading at a spread angle K. Incidentally, the slit beam emerging from the cylindrical lens 25 will hereinafter be referred to as a "second slit beam 72". The spread angle K by the cylindrical lens 25 is set so that the ratio between the spread angle ϵ of the first slit beam 71 and the spread angle K of the second slit beam 72 will be substantially equal to the power ratio between the laser beams split by the transparent flat plate 24. Therefore, the spread angle κ, of the second slit beam 72 is 5% of the spread angle ϵ of the first slit beam (κ=2.4 degrees).

With the above configuration, the slit beam projection unit 20 lets the laser diode 21 emit the laser beam according to the instructions from the processor 40 and thereby outputs the first and second slit beams 71 and 72 in the first and second directions respectively through a window 29 of the body case 10 formed under the imaging lens 31. Incidentally, since a red laser beam is emitted from the laser diode 21, each of the first and second slit beams 71 and 72 (generated from the red laser beam) is mainly composed of the red value R.

With the slit beam projection unit 20 configured as above, the power of the second slit beam 72 relative to the total power outputted by the laser diode 21 is as small as approximately 5% while the power of the first slit beam 71 split by the transparent flat plate 24 is 95%; however, the power of the first slit beam 71 (spread angle: 48 degrees) per unit angular width (approximately 20 µW/degree) is substantially equal to that (approximately 21 SW/degree) of the second slit beam 72 (spread angle: 2.4 degrees). When a document P is white paper that is placed the reference distance VP (330 mm) away from the slit beam projection unit 20, the illumination intensity achieved by the first and second slit beams 71 and 72 is approximately 1260 lux, by which a sufficient difference in luminance can be secured between the document P and loci of the slit beams even in places where the illumination intensity is 500-1000 lux (average room illumination). Therefore, a locus image of the slit beams can be extracted reliably by a difference extraction program 422 which will be explained later.

The explanation will be continued referring again to FIG. 1. The release button 52, made of a push button switch, is connected to the processor 40. The pressing of the release button 52 by the user is detected by the processor 40.

The mode selection switch 59 is implemented by a slide switch that is switchable between two positions, for example. The two switch positions of the mode selection switch 59 have been assigned to the processor 40 so that one will be recognized as a "normal mode" and the other as a "corrective imaging mode". The "normal mode" is a mode in which image data is generated directly from an image of the document P captured by the image capturing device 1, while the "corrective imaging mode" is a mode in which the image data is corrected into image data representing the document P shot from the front when the document P is shot from an oblique direction.

The memory card 55, implemented by a nonvolatile rewritable memory, is attachable and detachable to/from the body case 10.

The LCD 51 includes a liquid crystal display for displaying images. The LCD 51 displays images in response to image signals supplied from the processor 40. The processor 40 sends a variety of image signals to the LCD 51 depending on the situation, such as image signals for displaying real-time images captured by the CCD image sensor 32, image signals for displaying images stored in the memory card 55, image signals for displaying characters indicating the settings of the device, etc.

The finder 53, including an optical lens, is formed so that the user looking into the finder 53 from the rear of the image capturing device 1 can view a range substantially equal to the range of the image formed by the imaging lens 31 on the CCD image sensor 32.

FIG. 4 is a block diagram showing the electrical configuration of the image capturing device 1. The processor 40 installed in the image capturing device 1 includes a CPU 41, a ROM 42 and a RAM 43.

The CPU 41 executes various processes such as the detection of the pressing of the release button 52, the reading of image data from the CCD image sensor 32, the writing of image data into the memory card 55, the detection of the status of the mode selection switch 59, and the switching of the slit beam emission from the slit beam projection unit 20, according to processes specified by programs stored in the ROM 42 while using the RAM 43.

As shown in FIG. 4, the ROM 42 stores a camera control program 421, a slit beam locus extraction program 422, a triangulation calculation program 423, a document attitude calculation program 424 and a plane conversion program 425.

The camera control program 421 is a program for the overall control of the image capturing device 1, including a process shown in a flow chart of FIG. 5 (details will be explained later). The slit beam locus extraction program 422 is a program for extracting loci of the slit beams from an image of the document P onto which the slit beams are projected. The triangulation calculation program 423 is a program for calculating a three-dimensional spatial position for each pixel of the loci of the slit beams extracted by the slit beam locus extraction program 422. The document attitude calculation program 424 is a program for estimating the three-dimensional shape of the document P based on the three-dimensional spatial positions of loci 71a and 72a of the first and second slit beams. The plane conversion program 425 is a program which receives information on the position and attitude of the document P and thereby converts image data stored in a slit-beamless image storage unit 432 into an image of the document P shot from the front.

As shown in FIG. 4, various storage units are reserved in the RAM 43. Specifically, a slit-beamed image storage unit 431 and the slit-beamless image storage unit 432, for storing image data supplied from the CCD image sensor 32 as color value data represented by RGB values, are reserved in the RAM 43 as storage areas. Further, a subject pixel value temporary storage unit 433, for storing a red difference value Rd (obtained by subtracting the average of a green value G and a blue value B of a pixel from a red value R of the pixel) and an "Rd·Y value" (obtained by multiplying the red difference value Rd by a luminance value Y) regarding each pixel contained in a search range in a slit-beamed image, is reserved in the RAM 43. Furthermore, a triangulation calculation result storage unit 434 for storing calculation result of the position of each point in the slit-beamed image, a document attitude calculation result storage unit 435 for storing calculation result of the position and attitude of the document P, a slit beam locus information storage unit 436 for storing a barycenter position calculated in a slit beam barycenter position calculation process which will be explained later, and a working area 437 for temporarily storing data for the calculations by the CPU 41 are also reserved in the RAM 43.

In the following, the operation of the above image capturing device 1 after the release button 52 is pressed by the user will be explained referring to FIG. 5. FIG. 5 is a flow chart showing a process executed by the processor 40 of the image capturing device 1.

When the release button 52 is pressed by the user, the switch position of the mode selection switch 59 is detected and whether the switch is at the position of the "corrective imaging mode" or not is judged (S110). If the mode selection switch 59 is at the position of the "corrective imaging mode" (S110: YES), the process advances to step S120. In the step S120, an instruction for the emission by the laser diode 21 is issued to the slit beam projection unit 20, and with the first and second slit beams 71 and 72 projected by the slit beam projection unit 20, image data represented by RGB values is read out from the CCD image sensor 32 as the slit-beamed image. Further, the image data read out is stored in the slit-beamed image storage unit 431 of the RAM 43 in the step S120.

After the reading of the image data of the slit-beamed image (S120), the process advances to step S130. In the step S130, an instruction for stopping the emission by the laser diode 21 is issued to the slit beam projection unit 20, and after the emission of the first and second slit beams 71 and 72 is stopped, image data represented by RGB values is read out from the CCD image sensor 32 as a slit-beamless image. Further, the image data read out is stored in the slit-beamless image storage unit 432 of the RAM 43 in the step S130 (S130).

After the reading of the image data of the slit-beamless image (S120), the process advances to step S140. In the step S140, a slit beam locus extraction process (S140) for extracting the slit beams from the image data of the slit-beamed image loaded in the slit-beamed image storage unit 431 is executed by the slit beam locus extraction program 422.

Here, the slit beam locus extraction process (S140) will be explained in detail referring to FIGS. 6 through 9. The slit beam locus extraction process is a process for clearly discriminating pixels representing the slit beams from pixels not representing the slit beams in the slit-beamed image and thereby extracting the loci of the slit beams from the slit-beamed image with high accuracy.

First, the principle of the slit beam locus extraction process will be explained referring to FIGS. 6(a) and 6(b). FIG. 6(a) shows a captured image of the document P onto which the slit beams are projected. Formed on the document P are: a plurality of character string parts M extending in the width direction of the document, illumination reflecting parts S shown in rectangular shapes, printed parts I surrounded by circles as parts having the red (R) component as the main color component, and the loci 71a and 71b of the first and second slit beams extending in the width direction of the document P. The chain line extending in a direction orthogonal to the width direction of the document P represents a slit beam detecting position. The point of intersection of the slit beam detecting position (chain line) and the locus 71a of the first slit beam is defined as a slit beam detection pixel K.

FIG. 6(b) shows graphs indicating the values of prescribed parameters at the slit beam detecting position (the chain line in FIG. 6(a)), in which a part of each graph intersecting with a line drawn directly from the "slit beam detecting position" (from the chain line) indicates the value of each prescribed parameter at the "slit beam detecting position". In other words, a position on the vertical axis of each graph in FIG. 6(b) corresponds to a position on the vertical axis of FIG. 6(a). In the graphs A1, A2, A3 and A4, the red value R, the red difference value Rd, the luminance value Y and the product value Rd·Y (of the red difference value Rd and the luminance value Y) are employed as the prescribed parameters, respectively.

The red difference value Rd is obtained by subtracting the average of the green value G and the blue value B from the red value R. Therefore, the red difference value Rd is capable of emphasizing the red value R (corresponding to the R component as the main component of the slit beams) at the slit beam detecting position more than the other components (G value, B value). A pixel having a red value R close to its green value G and blue value B has a low red difference value Rd. On the other hand, a pixel having a red value R higher than its green value G and blue value B has a high red difference value Rd.

The luminance value Y represents the luminance of each pixel at the slit beam detecting position. The luminance value Y is the Y value in the YCbCr space. The conversion from the RGB space into the YCbCr space can be made by the following expressions:

$Y = 0.2989*R + 0.5866*G + 0.1145*B$ $Cb = 0.1687*R - 0.3312*G + 0.5000*B$ $Cr = 0.5000*R - 0.4183*G - 0.0816*B$

The graph A1 shows that the red value R is high at the slit beam detection pixel K, in the printed part I having the R component, and in the illumination reflecting parts S. Trying to detect the slit beam detection pixel K based on the red value R can result in failure. For example, in cases where the slit beam detection pixel K is contained in a printed part I having the R component or in an illumination reflecting part S, there is no distinct difference in the red value R between the slit beam detection pixel K and the other, and thus it is impossible to precisely detect or distinguish the slit beam detection pixel K from the printed part I having the R component or the illumination reflecting part S.

The graph A2 shows that the illumination reflecting parts S have lower red difference values Rd compared to the slit beam detection pixel K and the printed part I having the R component. Therefore, even when the slit beam detection pixel K is contained in an illumination reflecting part S, the slit beam detection pixel K can be precisely detected and distinguished from the illumination reflecting part S based on the red difference value Rd since there is a distinct difference in the red difference value Rd between the two. However, when the slit beam detection pixel K is contained in a printed part I having the R component, it is impossible to precisely detect or distinguish the slit beam detection pixel K from the printed part I having the R component based on the red difference value Rd since there is no distinct difference in the red difference value Rd between the two.

The graph A2 shows that the printed part I having the R component has a lower luminance value Y compared to the slit beam detection pixel K and the illumination reflecting parts S. Therefore, even when the slit beam detection pixel K is contained in a printed part I having the R component, the slit beam detection pixel K can be precisely detected and distinguished from the printed part I having the R component based on the luminance value Y since there is a distinct difference in the luminance value Y between the two. However, when the slit beam detection pixel is contained in an illumination reflecting part S, it is impossible to precisely detect or distinguish the slit beam detection pixel K from the illumination reflecting part S based on the luminance value Y since there is no distinct difference in the luminance value Y between the two.

Therefore, focusing on the fact that the slit beam detection pixel K has higher red difference value Rd and luminance value Y compared to illumination reflecting parts S and printed parts I having the R component as shown in the graphs A2 and A3, pixels representing the slit beams are detected in this process based on the product value Rd·Y of the red difference value Rd and the luminance value Y (hereinafter referred to as an "Rd·Y value").

As shown in the graph A4, the slit beam detection pixel K has a higher Rd·Y value compared to the illumination reflecting parts S and the printed part I having the R component. Therefore, even when the slit beam detection pixel K is contained in an illumination reflecting parts S or a printed part I having the R component, the slit beam detection pixel K can be precisely detected and distinguished from the illumination reflecting parts S or the printed part I based on the Rd·Y value since there is a distinct difference in the Rd·Y value between the slit beam detection pixel K and the other.

Figure 9:
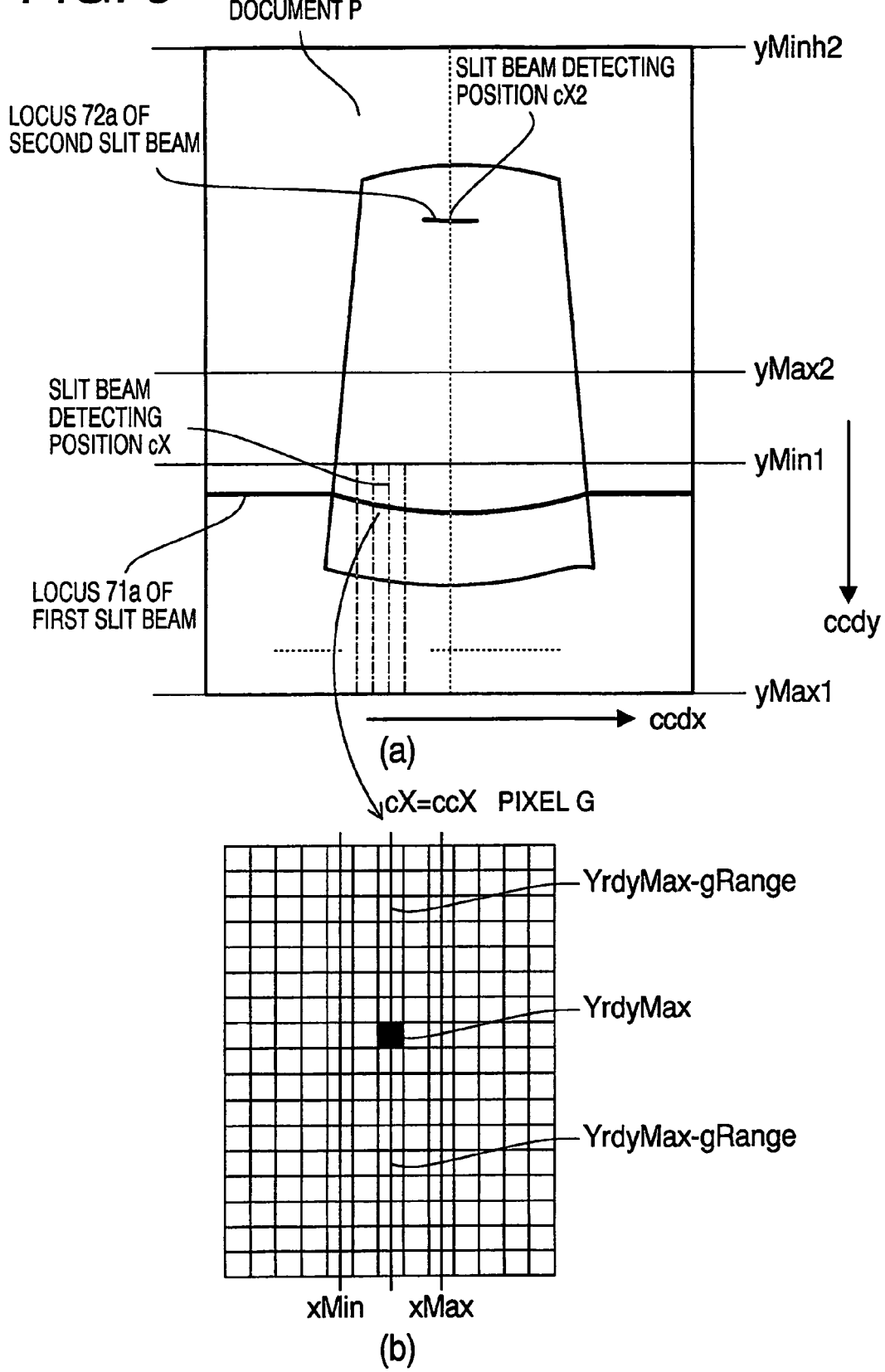

Next, a concrete procedure of the slit beam locus extraction process will be explained below referring to FIGS. 7-9. FIG. 7 is a flow chart of the slit beam locus extraction process. FIG. 8 is a flow chart of a slit beam barycenter calculation process included in the slit beam locus extraction process. FIG. 9(a) shows a captured image of the document P onto which the slit beams are projected. FIG. 9(b) is an enlarged view schematically showing pixels around a slit beam detecting position cX. Incidentally, the number of pixels in the captured image is W=1200 (pixels) in the width direction and H=1600 (pixels) in the height direction in this embodiment.

At the start of the slit beam locus extraction process (S140), search parameters specifying a search range, in which the locus 72a of the second slit beam is extracted, are set (S701). The search parameters include a position cX2 in the ccdx direction (on the locus 72a of the second slit beam) and positions yMin2 and yMax2 specifying a range in the ccdy direction as shown in FIG. 9.

Specifically, the position cX2 is set at 600 as the center of the width W of the captured image and the range yMin2-yMax2 is set at 0-799 to specify an area as the upper half of the captured image.

Only one position cX2 is set regarding the ccdx direction for the following reason. In this embodiment, a curvature $\phi$ is calculated by use of the locus 71a of the first slit beam, and thus only one locus coordinate on the ccdy axis is needed to be extracted as the locus 72a of the second slit beam in order to obtain a lean $\theta$ (rotation angle around an X-axis in the real space).

After setting the search parameters (S701), a slit beam barycenter position calculation process (explained later) is executed (S702). A barycenter position calculated in the slit beam barycenter position calculation process (S702) is stored in the slit beam locus information storage unit 436 (S703).

Subsequently, search parameters specifying another search range (in which the locus 71a of the first slit beam is extracted) are set (S704). The search parameters include positions yMin1 and yMax1 specifying a range in the ccdy direction.

Specifically, the range yMin1-yMax1 is set at 955-1599 to specify an area inside the lower half of the captured image. The range yMin1-yMax1 is not set to specify all the lower half of the captured image for the following reason. Since the first slit beam 71 is emitted from below the imaging lens 31 and in parallel with the optical axis of the imaging lens 31 in this embodiment, the range in which the first slit beam 71 can exist can be calculated back from the distance between the document P and the imaging lens 31 allowed in the shooting of the document P. Therefore, the search range may previously be narrowed down for realizing high-speed processing.

No search parameter regarding the ccdx direction is set for the locus 71a of the first slit beam since pixels are successively detected at preset intervals in the width direction in this embodiment. The initial value of the variable cX representing the position of detection of the locus 71a of the first slit beam is set at 0, the maximum value cXMax of the variable cX is set at the number of pixels in the width direction minus 1, and the detection interval dx is set at 20 (pixels). The detection of the locus 71a of the first slit beam is carried out successively from the initial value to the maximum value cXMax at the detection intervals dx. The successive detection corresponds to the repetition of steps S705-S709.

After setting the search parameters (S704), the variable cX is initialized (cX=0) (S705). Subsequently, whether the variable cX is smaller than the maximum value cXMax or not is judged (S706). If the variable cX is judged to be smaller than the maximum value cXMax (S706: YES), a slit beam barycenter calculation process (explained later) for the variable cX is executed (S707). A barycenter position calculated by the slit beam barycenter position calculation process (S707) is stored in the slit beam locus information storage unit 436 (S708).

Subsequently, the position of detection is updated by adding the detection interval dx to the variable cX (S709) and the sequence S706-S709 is repeated. At the point when the variable cX exceeds the maximum value cXMax (S706: NO), the slit beam locus extraction process is ended.

Next, the aforementioned slit beam barycenter calculation process (S702, S707) will be explained below referring to the flow chart of FIG. 8. The position of a pixel detected as a pixel representing a slit beam does not necessarily coincide with the position of the center of the slit beam's luminance due to the characteristics of the laser beam forming the slit beam and slight undulations of the surface of the subject. Therefore, the slit beam barycenter calculation process is executed for obtaining the barycenter position of the Rd·Y value in a prescribed range (area) around the detected pixel as the center and regarding the obtained barycenter position as a position representing the slit beam. Regarding the prescribed range, xRange=2 in the ccdx direction and grange=5 in the ccdy direction are set in this embodiment (see FIG. 9(b)).

At the start of the slit beam barycenter calculation process, values xMin and xMax representing a search range in the ccdx direction is set regarding the given variable cX (ditto for cX2) (S801). The value xMin is set at a minimum value cXmin (=the initial value=0) when the variable cX is at its minimum cXmin (=the initial value=0), and is set at cX−xRange in other cases. The value xMax is set at the maximum value cXmax of the variable cX when the variable cX is at the maximum cXmax, and is set at cX+xRange in other cases.

After setting the search range in the ccdx direction (S801), the red difference value Rd and the luminance value Y are calculated for each pixel within a range (area): xMin≦ccdx≦xMax, yMin≦ccdy≦yMax (S802, S803). Subsequently, the Rd·Y value is calculated for each pixel by multiplying the obtained red difference value Rd and luminance value Y together and the result is stored in the subject pixel value temporary storage unit 433 (S804).

Subsequently, a variable ccX, representing a detecting position within the ±xRange of the given variable cX, is initialized (ccX=xMin) (S805), and whether the variable ccX is still within the search range (ccX≦xMax) or not is judged (S806). If the variable ccX is within the search range (S806: YES), whether the variable ccX is also within an image range (0≦ccX, ccX<cMAX) or not is judged (S807). If the variable ccX is also within the image range (S807: YES), the Rd·Y values of pixels in the search range which have been stored in the subject pixel value temporary storage unit 433 are referred to and a pixel having the maximum Rd·Y value that is higher than a prescribed threshold value vTh is searched for (S808).

The pixel having the maximum Rd·Y value is extremely likely to be a pixel representing a slit beam in the search range as mentioned above. The condition that the maximum Rd·Y value of the pixel should be higher than the threshold value vTh is employed for the following reason. Even when a pixel has the maximum Rd·Y value, the pixel has a possibility of being representing a slit beam projected on another object far from the subject (the luminance is very low in this case) if the maximum Rd·Y value is not higher than the threshold value vTh. The condition is used for detecting pixels representing slit beams with high accuracy by excluding such a pixel having an Rd·Y value not higher than the threshold value vTh from the candidates.

After a pixel having the maximum Rd·Y value higher than the threshold value vTh is found inside the search range (S808), the barycenter position regarding the Rd·Y value within the ±gRange of the position of the found pixel is calculated (S809). Subsequently, the detecting position is updated (S810) and the above sequence from S806 to S810 is repeated.

When the barycenter calculation for the positions (variables ccX) within the ±xRange of cX is judged to be finished (S806: NO), a barycenter position regarding the ccdy direction is obtained by use of the Rd·Y value and the barycenter position obtained for each ccX within the ±xRange of cX, and the obtained barycenter position is regarded as a ccdy value (Yg) of the slit beam locus at the position cX (S811), by which the slit beam barycenter calculation process is ended.

Incidentally, the barycenter position Yg is obtained by use of the following expression, in which "Rd·Y" represents the Rd·Y value at each position y satisfying YrdyMax−grange≦y≦YrdyMax+grange.

[Expression 1]
$$\text{barycenter position } Yg = \frac{\frac{1}{2*gRange+1}\sum_{y=rdyMax-gRange}^{YrdyMax+gRange}(Rd*Y)*y}{\frac{1}{2*gRange+1}\sum_{y=rdyMax-gRange}^{YrdyMax+gRange}(Rd*Y)}$$

The explanation will be continued referring again to FIG. 5. After the slit beam locus extraction process (S140) is finished as explained above, an aberration correction process (S150) is executed. The aberration correction process is a process for correcting image distortion that is dependent on the angle from the optical axis.

After the aberration correction process (S150) is finished, a triangulation calculation process (S160) is executed. The triangulation calculation process is a process executed by the triangulation calculation program 423 for calculating a three-dimensional spatial position corresponding to each of the pixels representing the loci 71a and 71b of the first and second slit beams.

In the triangulation calculation process, based on image data loaded in the subject pixel value temporary storage unit 433, peaks of the loci 71a and 71b of the first and second slit beams in the lengthwise direction are determined by barycenter calculation for each coordinate in the crosswise direction of the image data, and a three-dimensional spatial position corresponding to the peak extraction coordinate is determined as explained below.

FIGS. 10(a) and 10(b) are schematic diagrams for explaining the slit-beamed image. FIGS. 11(a) and 11(b) are schematic diagrams for explaining a method for calculating the three-dimensional spatial positions of the slit beams. Here, a coordinate system of the image capturing device 1 with respect to the document P (curved in the crosswise direction) being shot as shown in FIG. 11(a) is defined as follows. The optical axis direction of the imaging lens 31 is defined as a Z-axis. A position that is a reference distance VP away from the image capturing device 1 is defined as the origin of X, Y and Z-axes. A horizontal direction and a vertical direction with respect to the image capturing device 1 are defined as the X-axis and the Y-axis, respectively.

The number of pixels of the CCD image sensor 32 in the X-axis direction will be called "ResX" and that in the Y-axis direction will be called "ResY". The upper end, lower end, left end and right end of the CCD image sensor 32 projected on the X-Y plane through the imaging lens 31 will be called "Yftop", "Yfbottom", "Xfstart" and "Xfend". The distance from the optical axis of the imaging lens 31 to the optical axis of the first slit beam 71 emitted from the slit beam projection unit 20 is assumed to be "D". The position of an intersection point of the first slit beam 71 and the X-Y plane measured in the Y-axis direction will be called "las1". The position of an intersection point of the second slit beam 72 and the X-Y plane measured in the Y-axis direction will be called "las2".

Under the above definitions, a three-dimensional spatial position (X1, Y1, Z1) corresponding to coordinates (ccdx1, ccdy1) of an attention point 1 (when a pixel of the image of the locus 71a of the first slit beam is paid attention to) on the CCD image sensor 32 is figured out from solutions of the following five simultaneous equations regarding triangles formed by the point on the imaging surface of the CCD image sensor 32, the emission point of the first and second slit beams 71 and 72, and intersection points with the X-Y plane.

$$Y1=-((las1+D)/VP)Z1+las1 \quad (1)$$

$$Y1=-(Ytarget/VP)Z1+Ytarget \quad (2)$$

$$X1=-(Xtarget/VP)Z1+Xtarget \quad (3)$$

$$Xtarget=Xfstart+(ccdx1/ResX)\times(Xfend-Xfstart) \quad (4)$$

$$Ytarget=Yftop-(ccdy1/ResY)\times(Yftop-Yfbottom) \quad (5)$$

Incidentally, las1=−D and thus Y1=−D in this embodiment since the first slit beam 71 is parallel to the Z-axis.

Similarly, a three-dimensional spatial position (X2, Y2, Z2) corresponding to coordinates (ccdx2, ccdy2) of an attention point 2 (when a pixel of the image of the locus 72a of the second slit beam is paid attention to) on the CCD image sensor 32 is figured out from solutions of the following five simultaneous equations.

$$Y2=-((las2+D)/VP)Z2+las2 \quad (1)$$

$$Y2=-(Ytarget/VP)Z2+Ytarget \quad (2)$$

$$X2=-(Xtarget/VP)Z2+Xtarget \quad (3)$$

$$Xtarget=Xfstart+(ccdx2/ResX)\times(Xfend-Xfstart) \quad (4)$$

$$Ytarget=Yftop-(ccdy2/ResY)\times(Yftop-Yfbottom) \quad (5)$$

The three-dimensional spatial positions of the slit beams calculated as above are written into the triangulation calculation result storage unit 434, by which the triangulation calculation process is ended.

After the triangulation calculation process (S160) is finished, a document attitude calculation process (S170) is executed. The document attitude calculation process is a process executed by the document attitude calculation program 424 for calculating the position and attitude of the document P based on the three-dimensional spatial positions of the slit beams. Here, the document attitude calculation process will be explained referring to FIGS. 12(a)-12(c). FIGS. 12(a)-12(c) are schematic diagrams for explaining a coordinate system used in the document attitude calculation.

The document attitude calculation process (S170) is executed as follows, for example. A curve is obtained by executing regression curve approximation to points at the three-dimensional spatial positions corresponding to the locus 71a of the first slit beam based on the data stored in the triangulation calculation result storage unit 434, and a straight line connecting a point on the curve where the position in the X-axis direction is "0" and a three-dimensional spatial position on the locus 72a of the second slit beam where the position in the X-axis direction is "0" is assumed. An intersection point of the straight line and the Z-axis (i.e. an intersection point of the optical axis and the document P) is obtained as a three-dimensional spatial position (0, 0, L) of the document P (see FIG. 12(a)), and the angle of the straight line with respect to the X-Y plane is obtained as a lean θ of the document P around the X-axis.

A state in which the curve obtained by the regression curve approximation of the locus 71a of the first slit beam is rotated by −θ (θ: the lean of the document P around the X-axis obtained above), that is, a state in which the document P is placed in parallel with the X-Y plane, is assumed as shown in FIG. 12(b). Subsequently, a cross section of the document P on the X-Z plane is considered as shown in FIG. 12(c). In the sectional form of the document P in the X-axis direction, displacements of the cross section in the Z-axis direction are obtained for a plurality of positions in the X-axis direction. Based on the displacements, curvature φ(X) indicating the gradient with respect to the X-axis direction is obtained as a function of the position X in the X-axis direction, by which the document attitude calculation process is ended.

After the document attitude calculation process (S170) is finished, a plane conversion process (S180) is executed. The plane conversion process is a process executed by the plane conversion program 425 for converting the image data stored in the slit-beamless image storage unit 432 into image data of an image observing the document P from the front based on three-dimensional shape data.

The plane conversion process will be explained below referring to a flow chart of FIG. 13. FIG. 13 is a flow chart showing the plane conversion process.

At the start of the plane conversion process, a processing area for this process is reserved in the working area 437 of the RAM 43 and an initial value for a variable "b" used for this process (e.g. a variable for a counter) is set (S1300).

Subsequently, an area of an erect image (an image of a surface of the document P on which characters, etc. are drawn or printed, viewed substantially in the orthogonal direction) is set by transforming the four corner points of the slit-beamless image based on the three-dimensional spatial position (0, 0, L), the lean θ around the X-axis and the curvature φ(X) of the document P which have been obtained by the calculations by the document attitude calculation program 425, and the number "a" of pixels contained in the area is obtained (S1301).

First, whether the variable "b" has reached the number "a" of pixels or not is judged (S1302). The area of the erect image set as above is first placed on the X-Y plane (S1303). The three-dimensional spatial position of each pixel contained in the area is shifted in the Z-axis direction based on the curvature φ(X) (S1304), rotated around the X-axis by the lean θ (S1305), shifted in the Z-axis direction by the distance L (S1306). Subsequently, a three-dimensional spatial position obtained as above is converted into coordinates (ccdcx, ccdcy) on a CCD image captured by an ideal camera according to the aforementioned relational expressions of triangulation (S1307), and the coordinates (ccdcx, ccdcy) are converted into coordinates (ccdx, ccdy) on a CCD image captured by the actual camera by means of a well-known calibration technique based on aberration characteristics of the imaging lens 31 being used (S1308). The state of a pixel of the slit-beamless image at the position is obtained and stored in the working area 437 of the RAM 43 (S1309). The above sequence is repeated for the number "a" of pixels (S1310, S1302), by which image data of the erect image is generated. After the processing area reserved in the working area 437 is released (S1311), the plane conversion process is ended.

The explanation will be continued referring again to FIG. 5. After the plane conversion process (S180) is finished, the generated image data of the erect image is written in the memory card 55 (S190).

In the aforementioned step S110, if the mode selection switch 59 is not at the "corrective imaging mode" but at the "normal mode" (S110: NO), a slit-beamless image is obtained from the CCD image sensor 32 with no laser beam emitted from the laser diode 21 and no first and second slit beams 71 and 72 outputted by the slit beam projection unit 20 (S200). The obtained image data is written into the memory card 55 (S210). In the "normal mode", the three-dimensional spatial position L, the lean θ and the curvature φ of the document P which have been explained above are not calculated, and thus such data are not written into the memory card 55.

As explained above, the image capturing device 1 in the "corrective imaging mode" projects the two slit beams (the first and second slit beams 71 and 72) onto the document P, captures an image of the document P by letting the imaging lens 31 focus the image on the CCD image sensor 32, and thereafter captures another image of the document P with no slit beams projected thereon.

When the loci of the slit beams are extracted from the slit-beamed image (one of the two captured images, in which the document P with the slit beams projected thereon is shot), a pixel having the maximum Rd·Y value (higher than the prescribed threshold value Yth) is detected in each prescribed range. In this case, even when the pixel representing a slit beam is contained in an illumination reflecting part S, the Rd·Y value is low (due to a low red value R) in the illumination reflecting part S and thus the difference between the illumination reflecting part S and the pixel (representing a slit beam) having the maximum Rd·Y value becomes distinct, by which pixels representing the slit beams can be detected with high accuracy.

Further, even when the pixel representing a slit beam is contained in a printed part I having the R component, the Rd·Y value is low (due to a low luminance value Y) in the printed part I having the R component and thus the difference between the printed part I having the R component and the pixel (representing a slit beam) having the maximum Rd·Y value becomes distinct, by which pixels representing the slit beams can be detected with high accuracy.

After the loci of the slit beams are extracted as above, the three-dimensional spatial position of each part of the loci of the slit beams is calculated according to the triangulation principle. The position, lean and curvature (the three-dimensional shape data) of the document P are obtained from the calculated three-dimensional spatial positions, and the obtained three-dimensional shape data and the image data of the slit-beamless image are written into the memory card 55.

Therefore, with the image capturing device 1, the user is allowed to store image data, that has been corrected as if a flat document P were shot from its front, in the card memory 55 even when the user is shooting a deformed (e.g. curved) document P from an oblique direction, by switching the mode selection switch 59 to the "corrective imaging mode", checking through the finder 53 or the LCD 51 whether a desired range of the document P has been fit in the shooting frame, and shooting the image by pressing the release button 52. As a countermeasure against the "camera shake" with a portable three-dimensional shape detecting device, it is generally possible to let the three-dimensional shape detecting device extract the slit beams from the slit-beamed image only, without subtracting the slit-beamless image from the slit-beamed image. For example, slit beams in the infrared region can be used. However, such a device requires two optical systems (a system for the infrared region and a system for the visible region) and that causes problems like enlargement of the portable device, complication of device structure, an increase in the cost, etc. It is desirable that the slit beams can be precisely extracted from only one slit-beamed image using slit beams in the visible region. However, in an image captured in a general lighting environment, the luminance and chroma saturation of a part representing a locus of a slit beam are close to those of other parts, and thus no clear difference can be detected. Such a tendency is remarkable especially in a printed part that has been printed in a color similar to the slit beams or in a part reflecting illumination of a color similar to the slit beams, by which precise detection of the slit beams becomes difficult. The accuracy of the slit beam detection can be increased by raising the power of the slit beams; however, the cost can rise due to the upsizing of the slit beam generating unit and it becomes necessary to consider safety. In this embodiment resolving the above problems, the pixels representing the slit beams can be detected with high accuracy, without the need of raising the power of the slit beams.

In the following, a second embodiment regarding the aforementioned slit beam locus extraction process (S140) will be described in detail referring to FIGS. 14-17. When the document P includes a part having the R component extremely stronger than other components, a part having extremely high reflectance (from which the reflected slit beam can not sufficiently return to the camera due to regular reflection) or a part having extremely low reflectance (from which the reflected slit beam can not sufficiently return to the camera due to absorption), a pixel representing a slit beam can not necessarily have a high Rd·Y value compared to other parts, and thus the pixel having the maximum Rd·Y value can not necessarily be a pixel representing a slit beam.

Therefore, in the slit beam locus extraction process in the second embodiment, even the pixel at the barycenter position calculated by the slit beam barycenter calculation process is not immediately treated as a pixel representing a slit beam, and whether the pixel has a corresponding pixel in the slit-beamless image or not is judged (the slit-beamless image is searched for such a corresponding pixel). If the slit-beamless image has no pixel corresponding to the pixel at the barycenter position, the pixel at the barycenter position is judged to be a pixel unique to the slit-beamed image, that is, a pixel representing a slit beam.

FIG. 14 is a block diagram showing the electrical configuration of an image capturing device 1 which executes the slit beam locus extraction process in accordance with the second embodiment. In FIG. 14 which corresponds to FIG. 4, reference characters identical with those in FIG. 4 designate elements identical with those of FIG. 4 and thus repeated description thereof is omitted for brevity.

The ROM 42 includes a luminance variance calculation program 426 for calculating the standard deviation regarding color values in each small area in the slit-beamless image, a cross-correlation coefficient calculation program 427 for calculating a shift amount between the slit-beamed image and the slit-beamless image, and a corresponding pixel searching program 428 for searching the slit-beamless image for a pixel detected from the slit-beamed image, in addition to the programs which have been explained referring to FIG. 4. The RAM 43 includes a camera shake amount storage unit 438 for storing the shift amount between the slit-beamed image and the slit-beamless image calculated by the cross-correlation coefficient calculation program 428, in addition to the various storage units which have been explained referring to FIG. 4.

Next, the slit beam locus extraction process in accordance with the second embodiment will be explained referring to a flow chart of FIG. 15. At the start of the slit beam locus extraction process in the second embodiment, the shift amount between the slit-beamed image and the slit-beamless image is calculated (S1501).

Since the slit-beamed image and the slit-beamless image are not captured at the same time, there is a case where the "camera shake" by the user causes a mismatch between the corresponding pixels in the slit-beamed image and the slit-beamless image. Therefore, the shift amount between the slit-beamed image and the slit-beamless image is calculated before the search regarding whether or not the slit-beamless image includes a pixel corresponding to the barycenter position calculated by the slit beam barycenter calculation process, and the slit-beamless image is searched taking the shift amount into consideration.

The shift amount between the slit-beamed image and the slit-beamless image can be obtained by letting the cross-correlation coefficient calculation program 427 calculate the cross-correlation coefficient "cc" between the two pixels. Incidentally, the cross-correlation coefficient cc can take on values between −1 and 1, and a position giving the maximum value represents the shift amount.

It is desirable that the calculation of the cross-correlation coefficient cc be made in characteristic parts of the images since no clear difference in the cross-correlation coefficient cc is obtained by calculating the cross-correlation coefficient cc in solid white parts, solid black parts, parts in a particular solid color, etc. Therefore, a search process, for searching for a characteristic part in the slit-beamless image, is executed before the calculation of the cross-correlation coefficient cc.

In the search process, the slit-beamless image is partitioned into four large areas 1-4 as shown in FIG. 16. Each large area 1-4 is further partitioned into small areas arranged from a corner of the large area (upper right in the area 1, upper left in the area 2, lower left in the area 3, lower right in the area 4) toward the center of the slit-beamless image, and the standard deviation of the luminance Y is obtained in each small area. The standard deviation σY of the luminance Y is calculated by the luminance variance calculation program 426 according to the following expressions.

In the following expressions, (xc, yc) represents a pixel at the center of the small area and "Rd" represents half the size of the small area. Specifically, when the image size is approximately 1200 pixels×1600 pixels, the size of the small area may be set at approximately 41 pixels×41 pixels (Rd=20 in the expressions).

standard deviation $\sigma y$ of luminance $Y =$ [Expression 2]

$$\sqrt{\frac{\sum_{y=yc-Rd}^{yc+Rd}\left\{\sum_{x=xc-Rd}^{xc+Rd}(Y(x,y)-\overline{Y})^2\right\}}{(2R+1)^4}}$$

$$\text{average } \overline{Y} \text{ of luminance } Y = \frac{\sum_{y=yc-Rd}^{yc+Rd}\left\{\sum_{x=xc-Rd}^{xc+Rd} Y(x, y)\right\}}{(2R+1)^2} \quad \text{[Expression 3]}$$

In each large area 1-4, the coordinates of the center of a small area having the maximum standard deviation is regarded as a central position (xc, yc) where the cross-correlation coefficient cc should be obtained. A position difference (xd, yd) between a pixel of the slit-beamed image in the vicinity of the central position and a pixel of the slit-beamless image in the vicinity of the central position is defined, and a cross-correlation coefficient cc(xd, yd) at each position difference (xd, yd) is calculated. The position difference (xd, yd) giving the maximum cross-correlation coefficient can be regarded as the shift amount.

In the following expression, the position difference between a pixel of the slit-beamed image and a pixel of the slit-beamless image is expressed as "(xd, yd)", the luminance of the pixel of the slit-beamed image is expressed as "Y1", and that in the slit-beamless image is expressed as "Y2". In the case where the image size is approximately 1200 pixels× 1600 pixels, the range (area) for obtaining the cross-correlation coefficient cc may also be set at approximately 41 pixels× 41 pixels (Rc=20).

cross-correlation coefficient $CC(xd, yd) =$ [Expression 4]

$$\frac{\frac{1}{(2Rc+1)^2} \sum_{y=yc-Rc}^{yc+Rc}\left\{\sum_{x=xc-Rc}^{xc+Rc} (Y1(x, y) - \overline{Y1})(Y2(x+xd, y+yd) - \overline{Y2})\right\}}{\sqrt{\frac{\sum_{y=yc-Rc}^{yc+RC}\left\{\sum_{x=xc-Rc}^{xc+Rc} (Y1(x, y) - \overline{Y1})^2\right\}}{(2Rc+1)^4}} \sqrt{\frac{\sum_{y=yc-Rc}^{yc+RC}\left\{\sum_{x=xc-Rc}^{xc+Rc} (Y2(x+xd, y+yd) - \overline{Y2})^2\right\}}{(2Rc+1)^4}}}$$

The explanation will be continued referring again to FIG. 15. After the shift amount between the slit-beamed image and the slit-beamless image is calculated as explained above (S1501), search parameters specifying a search range for extracting the locus 72a of the second slit beam are set (S1502) and the slit beam barycenter position calculation process is executed (S1503) similarly to the steps S701 and S702 of FIG. 7. Subsequently, whether the slit-beamless image includes a pixel corresponding to the pixel at the barycenter position calculated by the slit beam barycenter position calculation process (S1503) or not is judged (the slit-beamless image is searched for such a corresponding pixel) (S1504).

Assuming that a pixel detected from the slit-beamed image as a pixel representing a slit beam is found at (xp, yp) in the large area 4 as shown in FIG. 17, for example, a pixel corresponding to the detected pixel is searched for within a range:

$xp+dx4-Rs \leq x \leq xp+dx4+Rs$ $xp+dy4-Rs \leq y \leq yp+dy4+Rs$ considering the shift amount (dx4, dy4) of the large area 4 in the slit-beamless image which has been calculated in the step S1501.

Incidentally, when the distance from the subject is approximately 350 mm and the image size is approximately 1200 pixels×1600 pixels, the camera shake amount is several tens of pixels and thus "Rs" may be set at several tens of pixels.

If a corresponding pixel is found in the slit-beamless image by the search (S1505: YES), it means that the pixel exists both in the slit-beamed image and in the slit-beamless image, that is, the pixel detected from the slit-beamed image can not be judged as a pixel representing a slit beam. Therefore, the pixel in the vicinity of the calculated barycenter position is excluded from the targets of extraction (S1506) and thereafter the sequence of S1503-S1505 is repeated. On the other hand, if no corresponding pixel is found in the slit-beamless image (S1505: NO), the pixel is judged to be a pixel unique to the slit-beamed image (not existing in the slit-beamless image), that is, a pixel representing a slit beam, and thus the calculated barycenter position is stored in the slit beam locus information storage unit 436 (S1507).

After the locus 72a of the second slit beam is extracted as above, in order to extract the locus 71a of the first slit beam, search parameters specifying a search range for extracting the locus 71a of the first slit beam are set (S1509) similarly to the step S704 of FIG. 7, and thereafter a sequence of S1509-S1516 (corresponding to the sequence of S705-S711 in FIG. 7) is repeated.

Incidentally, as mentioned above, in the slit beam locus extraction process in the second embodiment, whether the slit-beamless image includes a pixel corresponding to the barycenter position calculated by the slit beam barycenter calculation process (S1511) or not is judged (the slit-beamless image is searched for such a corresponding pixel) (S1512), similarly to the judgment for the locus 72a of the second slit beam. If a corresponding pixel is found in the slit-beamless image by the search (S1513: YES), the pixel in the vicinity of the calculated barycenter position is excluded from the targets of extraction (S1514) and thereafter the sequence of S1511-S1513 is repeated. On the other hand, if no corresponding pixel is found in the slit-beamless image (S1513: NO), the calculated barycenter position is stored in the slit beam locus information storage unit 436 (SI515).

As explained above, in the slit beam locus extraction process in the second embodiment, even when a pixel having the maximum Rd·Y value higher than the threshold value Yth is detected, the search for judging whether the slit-beamless image includes a pixel corresponding to the detected pixel or not is executed further. When a corresponding pixel is judged to exist in the slit-beamless image, the detected pixel is regarded as a pixel common to the slit-beamed image and the slit-beamless image (i.e. a pixel not representing a slit beam) and is excluded from the targets of extraction. On the other hand, when no corresponding pixel is judged to exist in the slit-beamless image, the detected pixel is regarded as a pixel existing only in the slit-beamed image (i.e. a pixel representing a slit beam) and is treated as an extraction target pixel. By the slit beam locus extraction process, pixels representing the slit beams are detected with still higher accuracy compared to the slit beam locus extraction process in the first embodiment, by which the loci of the slit beams can be extracted with higher accuracy.

In the above embodiments, the step S140 in the flow chart of FIG. 5 corresponds to "pattern light position extracting means" and a "pattern light position extraction step". The steps S150-S170 in the flow chart of FIG. 5 correspond to "three-dimensional shape calculation means" or a "three-dimensional shape calculation step". The step S802 in the flow chart of FIG. 8 corresponds to "hue parameter calculation means" and a "hue parameter calculation step". The step S803 in the flow chart of FIG. 8 corresponds to "luminance parameter calculation means" and a "luminance parameter calculation step". The step S804 in the flow chart of FIG. 8 corresponds to "emphasis parameter calculation means" and an "emphasis parameter calculation step". The step S808 in the flow chart of FIG. 8 corresponds to "pattern light detecting means" and a "pattern light detecting step". The steps S1504 and S1505 and the steps S1512 and S1513 in the flow chart of FIG. 15 correspond to "search means". The step S1501 in the flow chart of FIG. 15 corresponds to "shift amount calculation means".

While the present invention has been illustrated above with reference to the embodiments, in can easily be inferred that the present invention is not to be restricted by the above embodiments and various improvements and modifications are possible without departing from the scope and spirit of the present invention.

For example, while the slit beams having the red component as the main component are extracted in the above embodiments, the component to be regarded as the main component is not limited to the red component; slit beams having the green component or blue component as the main component may also be extracted. In the case where slit beams having the green component as the main component (instead of the slit beams having the red component as the main component) are extracted, for example, a green difference value Gd(=G−(R+B/2)) may be calculated instead of the red difference value Rd(=R−(G+B/2)) and a Gd•Y value may be employed instead of the Rd•Y value.

While the red difference value Rd in the above embodiments is calculated by subtracting the average of the green value G and the blue value B from the red value R, the red difference value Rd may also be calculated by subtracting a weighted average of the green value G and the blue value B from the red value R. For example, the red difference value Rd may be obtained by an expression Rd=R−(2·G+1·B)/3.

The subject being shot by the image capturing device 1 is not restricted to a sheet-like document P but can also be a smooth surface of a solid block or, depending on the situation, a surface of an object having ridge lines. The effect of detecting the three-dimensional shape of a subject can be achieved equally for any purpose seeking to figure out a three-dimensional shape in a three-dimensional space based on loci of substantially two slit beams.

However, if the subject is a sheet-like document P as in the above embodiments, it is possible to estimate the shape of the whole document P by regarding the locus 71a of the first slit beam as a sectional form of the document P and thereby carry out the image correction in regard to deformation (e.g. curvature) of the document P.

While the slit beam projection unit 20 is configured to output two slit beams (the first and second slit beams 71 and 72) in the image capturing device 1 of the above embodiments, the number of outputted slit beams is not restricted to two, that is, the image capturing device may be configured to output three or more slit beams. For example, the slit beam projection unit 20 may be configured so that a third slit beam (in addition to the first and second slit beams 71 and 72) similar to the second slit beam 72 will be projected onto a part of the document P above the second slit beam 72 as depicted in FIG. 10(b) showing a locus image of the slit beams on the document P. In this case, a curved shape of the document P in its lengthwise direction can also be estimated based on the positions of points on the loci of the first through third slit beams, by which an image still easier to see can be generated by the correction of the slit-beamless image.

While the laser diode 21 emitting a red laser beam is used as the light source in the above embodiments, a light source of any type (plane emission laser, LED, EL device, etc.) can be employed as long as an optical beam can be outputted.

The transparent flat plate 24 may be replaced with a transparent flat plate having a surface provided with a diffraction grating diffracting a prescribed ratio of the power of the incident laser beam in a particular direction. In this case, a 0th order laser beam passing through the diffraction grating and a 1st order laser beam diffracted by the diffraction grating can be used as the first and second slit beams 71 and 72, respectively.

The shape of each slit beam outputted by the slit beam projection unit 20 is not restricted to a thin line extremely narrowed in a direction orthogonal to its longitudinal direction but can be a stripe-like beam pattern having a certain width.

The positional relationship between the first and second slit beams 71 and 72 may be inverted, that is, the optical elements may be arranged so that the second slit beam 72 will be formed in the first direction (below the first slit beam 71 when viewed from the image capturing device 1) and the first slit will be formed in the second direction.

While the image capturing device 1 is configured to capture the slit-beamed image and the slit-beamless image by use of the imaging lens 31 and the CCD image sensor 32, the image capturing device may be provided with extra imaging lens and CCD image sensor for capturing the slit-beamed image in addition to the imaging lens 31 and the CCD image sensor 32. With such a configuration, the time lag between the capturing of the slit-beamed image and the capturing of the slit-beamless image (time for the transfer of image data from the CCD image sensor 32, etc.) can be eliminated. Therefore, deviation in the imaging range of the slit-beamless image from that of the slit-beamed image can be eliminated and the three-dimensional shape of the subject can be detected more precisely. However, compared to this example, the image capturing devices 1 of the above embodiments are capable of realizing a reduced size, price, and number of components.

In an embodiment of the present invention, the hue parameter calculation means may be configured to calculate the hue parameter by subtracting an average of other color values from a color value corresponding to the main hue forming the pattern light.

With the above configuration, the hue parameter is calculated by subtracting the average of other color values from the color value corresponding to the main hue forming the pattern light, by which each pixel whose color value corresponding to the main hue forming the pattern light is high can be emphasized more than other pixels. In other words, the pixels representing the pattern light can be emphasized more than other pixels since each pixel representing the pattern light has a high color value corresponding to the main hue forming the pattern light. Conversely, each pixel whose color values are close to one another can be excluded from the targets of detection.

In an embodiment of the present invention, the three-dimensional shape detecting device may further comprise emphasis parameter calculation means which calculates emphasis parameters (for emphasizing the pixels representing the pattern light more than other pixels in the pattern light projection image) in units of pixels based on the luminance parameters calculated by the luminance parameter calculation means and the hue parameters calculated by the hue parameter calculation means. In this case, the pattern light detecting means detects the pixels representing the pattern light from the pattern light projection image based on the emphasis parameters calculated by the emphasis parameter calculation means.

In an embodiment of the present invention, the emphasis parameter calculation means may be configured to calculate the emphasis parameter by multiplying the hue parameter and the luminance parameter together.

With the above configuration, the emphasis parameter is calculated by multiplying the hue parameter and the luminance parameter together. Therefore, the value of the emphasis parameter stands out when both the hue parameter and the luminance parameter are high, by which the difference between the pixels representing the pattern light and the other pixels becomes clearer and the pixels representing the pattern light can be detected with still higher accuracy.

In an embodiment of the present invention, a prescribed threshold value may be set regarding the emphasis parameters, and the pattern light detecting means may be configured to detect pixels having emphasis parameters higher than the threshold value from the pattern light projection image as the pixels representing the pattern light.

With the above configuration, the pattern light detecting means detects pixels having emphasis parameters higher than the threshold value from the pattern light projection image as the pixels representing the pattern light. Therefore, by setting the threshold value lower than a presumed value of the emphasis parameter, pixels obviously not representing the pattern light can be excluded from the targets of detection.

In an embodiment of the present invention, the pattern light detecting means may be configured to detect the pixels representing the pattern light regarding prescribed areas along the pattern light on the pattern light projection image, in which a pixel having the maximum emphasis parameter in each prescribed area may be detected as the pixel representing the pattern light.

With the above configuration, the pattern light detecting means detects a pixel having the maximum emphasis parameter in each prescribed area as the pixel representing the pattern light, by which a pixel most likely to be representing the pattern light can be detected from the pixels forming each prescribed area.

In an embodiment of the present invention, the image capturing means may be configured to capture a pattern light non-projection image corresponding to the pattern light projection image (as an image of the subject on which the pattern light is not projected) in addition to the pattern light projection image. In this case, the three-dimensional shape detecting device may further comprise search means which searches the pattern light non-projection image to judge whether a pixel corresponding to each of the pixels representing the pattern light detected by the pattern light detecting means exists in the pattern light non-projection image or not, and the pattern light position extracting means may be configured to use each pixel detected by the pattern light detecting means for the extraction of the position of the pattern light if no pixel corresponding to the pixel is found in the pattern light non-projection image by the search means.

With the above configuration, the pattern light position extracting means uses each pixel detected by the pattern light detecting means for extracting a locus of the pattern light if no pixel corresponding to the pixel is found in the pattern light non-projection image. Therefore, among the pixels detected by the pattern light detecting means, only those unique to the pattern light projection image (not existing in the pattern light non-projection image), that is, only pixels representing the pattern light can be regarded as the targets of extraction. Consequently, the accuracy of the pattern light position extraction can be increased further.

In an embodiment of the present invention, the three-dimensional shape detecting device may further comprise shift amount calculation means which calculates a shift amount of the pattern light non-projection image from the pattern light projection image. In this case, the search means can search the pattern light non-projection image taking the shift amount of the pattern light non-projection image from the pattern light projection image calculated by the shift amount calculation means into consideration.

With the above configuration, the search means is allowed to search the pattern light non-projection image taking the shift amount of the pattern light non-projection image from the pattern light projection image calculated by the shift amount calculation means into consideration. While it is possible to set a wider search range considering cases where there is a shift of the pattern light non-projection image from the pattern light projection image due to the camera shake, the above configuration allows the narrowing down of the search range, by which the search can be executed at high speed and with high accuracy.

In accordance with an embodiment of the present invention, there is provided an image capturing device comprising: the three-dimensional shape detecting device according to any one of the various embodiments described above; and plane image correction means which corrects a pattern light non-projection image (as an image of the subject on which the pattern light is not projected which is captured by the image capturing means of the three-dimensional shape detecting device) into a plane image of the subject observed from a direction substantially orthogonal to a prescribed surface of the subject based on the three-dimensional shape of the subject calculated by the three-dimensional shape calculation means of the three-dimensional shape detecting device.

With such an image capturing device, the three-dimensional shape of the subject can be calculated with high accuracy by the three-dimensional shape detecting device by the precise extraction of the position of the pattern light, by which the pattern light non-projection image can be corrected into a precise plane image.

In an embodiment of the present invention, the three-dimensional shape detecting program may further comprise an emphasis parameter calculation step of calculating emphasis parameters (for emphasizing the pixels representing the pattern light more than other pixels in the pattern light projection image) in units of pixels based on the luminance parameters calculated by the luminance parameter calculation step and the hue parameters calculated by the hue parameter calculation step. In this case, the pattern light detecting step may detect the pixels representing the pattern light from the pattern light projection image based on the emphasis parameters calculated by the emphasis parameter calculation step.

What is claimed is:

1. A three-dimensional shape detecting device comprising:
    a projector which projects pattern light;
    an image capturing unit which captures a pattern light projection image of a subject on which the pattern light is projected;
    a pattern light position extracting unit which extracts a position of the pattern light projected on the subject based on the pattern light projection image captured by the image capturing unit;
    a three-dimensional shape calculation unit which calculates three-dimensional shape of the subject based on the position of the pattern light extracted by the pattern light position extracting unit;

a storage unit which stores color value data of the pattern light projection image captured by the image capturing unit;

a hue parameter calculation unit which calculates hue parameters corresponding to a main hue forming the pattern light in units of pixels based on the color value data stored in the storage unit;

a luminance parameter calculation unit which calculates luminance parameters in units of pixels based on the color value data stored in the storage unit; and a pattern light detecting unit which detects pixels representing the pattern light from the pattern light projection image by use of the luminance parameters calculated by the luminance parameter calculation unit and the hue parameters calculated by the hue parameter calculation unit, wherein:

the pattern light position extracting unit extracts the position of the pattern light based on the pixels representing the pattern light detected by the pattern light detecting unit.

2. The three-dimensional shape detecting device according to claim 1, wherein the hue parameter calculation unit calculates the hue parameter by subtracting an average of other color values from a color value corresponding to the main hue forming the pattern light.

3. The three-dimensional shape detecting device according to claim 1, further comprising an emphasis parameter calculation unit which calculates emphasis parameters, for emphasizing the pixels representing the pattern light more than other pixels in the pattern light projection image, in units of pixels based on the luminance parameters calculated by the luminance parameter calculation unit and the hue parameters calculated by the hue parameter calculation unit, wherein:

the pattern light detecting unit detects the pixels representing the pattern light from the pattern light projection image based on the emphasis parameters calculated by the emphasis parameter calculation unit.

4. The three-dimensional shape detecting device according to claim 3, wherein the emphasis parameter calculation unit calculates the emphasis parameter by multiplying the hue parameter and the luminance parameter together.

5. The three-dimensional shape detecting device according to claim 3, wherein:

a prescribed threshold value is set regarding the emphasis parameters, and the pattern light detecting unit detects pixels having emphasis parameters higher than the threshold value from the pattern light projection image as the pixels representing the pattern light.

6. The three-dimensional shape detecting device according to claim 1, wherein the pattern light detecting unit detects the pixels representing the pattern light regarding prescribed areas along the pattern light on the pattern light projection image, in which a pixel having the maximum emphasis parameter in each prescribed area is detected as the pixel representing the pattern light.

7. The three-dimensional shape detecting device according to claim 1, wherein:

the image capturing unit is configured to capture a pattern light non-projection image corresponding to the pattern light projection image, as an image of the subject on which the pattern light is not projected, in addition to the pattern light projection image, and the three-dimensional shape detecting device further comprises a search unit which searches the pattern light non-projection image to judge whether a pixel corresponding to each of the pixels representing the pattern light detected by the pattern light detecting unit exists in the pattern light non-projection image or not, and the pattern light position extracting unit uses each pixel detected by the pattern light detecting unit for the extraction of the position of the pattern light if no pixel corresponding to the pixel is found in the pattern light non-projection image by the search unit.

8. The three-dimensional shape detecting device according to claim 7, further comprising a shift amount calculation unit which calculates a shift amount of the pattern light non-projection image from the pattern light projection image, wherein:

the search unit searches the pattern light non-projection image taking the shift amount of the pattern light non-projection image from the pattern light projection image calculated by the shift amount calculation unit into consideration.

9. A three-dimensional shape detecting device comprising:

a projector which projects pattern light;

an image capturing unit which captures a pattern light projection image of a subject on which the pattern light is projected, while also capturing a pattern light non-projection image corresponding to the pattern light projection image as an image of the subject on which the pattern light is not projected;

a pattern light position extracting unit which extracts a position of the pattern light projected on the subject based on the pattern light projection image captured by the image capturing unit;

a three-dimensional shape calculation unit which calculates three-dimensional shape of the subject based on the position of the pattern light extracted by the pattern light position extracting unit;

a pattern light detecting unit which detects pixels representing the pattern light from the pattern light projection image; and a search unit which searches the pattern light non-projection image to judge whether a pixel corresponding to each of the pixels representing the pattern light detected by the pattern light detecting unit exists in the pattern light non-projection image or not, wherein:

the pattern light position extracting unit uses each pixel detected by the pattern light detecting unit for the extraction of the position of the pattern light if no pixel corresponding to the pixel is found in the pattern light non-projection image by the search unit.

10. An image capturing device comprising:

the three-dimensional shape detecting device according to claim 1; and a plane image correction unit which corrects a pattern light non-projection image, as an image of the subject on which the pattern light is not projected which is captured by the image capturing unit of the three-dimensional shape detecting device, into a plane image of the subject observed from a direction substantially orthogonal to a prescribed surface of the subject based on the three-dimensional shape of the subject calculated by the three-dimensional shape calculation unit of the three-dimensional shape detecting device.

11. A computer readable medium containing instructions for detecting a three-dimensional shape of a subject, the instructions causing a computer to execute:

a pattern light position extraction step of extracting a position of pattern light projected on a subject based on a pattern light projection image captured by image capturing unit which captures the pattern light projection image of the subject on which the pattern light is projected;

a three-dimensional shape calculation step of calculating three-dimensional shape of the subject based on the position of the pattern light extracted by the pattern light position extraction step;

a storage step of storing color value data of the pattern light projection image;

a hue parameter calculation step of calculating hue parameters corresponding to a main hue forming the pattern light in units of pixels based on the color value data stored by the storage step;

a luminance parameter calculation step of calculating luminance parameters in units of pixels based on the color value data stored by the storage step; and a pattern light detecting step of detecting pixels representing the pattern light from the pattern light projection image by use of the luminance parameters calculated by the luminance parameter calculation step and the hue parameters calculated by the hue parameter calculation step, wherein:

the pattern light position extraction step extracts the position of the pattern light based on the pixels representing the pattern light detected by the pattern light detecting step.

12. The computer program product according to claim 11, the instructions further causing the computer to execute an emphasis parameter calculation step of calculating emphasis parameters, for emphasizing the pixels representing the pattern light more than other pixels in the pattern light projection image, in units of pixels based on the luminance parameters calculated by the luminance parameter calculation step and the hue parameters calculated by the hue parameter calculation step, wherein:

the pattern light detecting step detects the pixels representing the pattern light from the pattern light projection image based on the emphasis parameters calculated by the emphasis parameter calculation step.

* * * * *